US006868501B2

United States Patent
Saitou et al.

(10) Patent No.: US 6,868,501 B2
(45) Date of Patent: Mar. 15, 2005

(54) SYSTEM AND METHOD FOR CONTROLLING SYSTEM POWER BY SEQUENTIALLY CONTROLLING THE INITIATING OF A PLURALITY OF DISK DRIVE GROUPS

(75) Inventors: Katsuhiro Saitou, Tokyo (JP); Hiroharu Ikebe, Tokyo (JP)

(73) Assignee: NEC Corporation, Tokyo (JP)

( * ) Notice: Subject to any disclaimer, the term of this patent is extended or adjusted under 35 U.S.C. 154(b) by 630 days.

(21) Appl. No.: 09/941,710

(22) Filed: Aug. 30, 2001

(65) Prior Publication Data

US 2002/0026595 A1 Feb. 28, 2002

(30) Foreign Application Priority Data

Aug. 30, 2000 (JP) .................................. 2000-260239

(51) Int. Cl.[7] .................................................. G06F 1/26
(52) U.S. Cl. .................................... 713/330; 713/300
(58) Field of Search .............................. 713/300, 330, 713/1, 2; 711/114

(56) References Cited

U.S. PATENT DOCUMENTS

| 5,414,863 | A | * | 5/1995 | Lee et al. ................... 713/330 |
| 5,450,576 | A | * | 9/1995 | Kennedy ....................... 713/2 |
| 6,012,124 | A | * | 1/2000 | Kamo et al. ................ 711/114 |
| 6,301,674 | B1 | * | 10/2001 | Saito et al. ................ 713/340 |
| 6,333,650 | B1 | * | 12/2001 | Amin et al. ................ 327/143 |

FOREIGN PATENT DOCUMENTS

JP 06236964 A * 8/1994 .......... H01L/27/04

* cited by examiner

Primary Examiner—Mark Connolly
(74) Attorney, Agent, or Firm—Sughrue Mion, PLLC

(57) ABSTRACT

Either when a first set time elapses after a circuit signal for turning ON a power supply circuit of a certain disk drive group was outputted or after the disk drive group completed its start, a circuit signal for turning ON a power supply circuit corresponding to a next disk drive group is outputted to start disk drives sequentially at a time interval. When the disk drive group is not started, after the lapse of a second set time shorter than the first set time, the circuit signal for turning ON a power supply circuit corresponding to the next disk drive group is outputted to start the next disk drive group.

11 Claims, 16 Drawing Sheets

SYSTEM AND METHOD FOR CONTROLLING SYSTEM POWER BY SEQUENTIALLY CONTROLLING THE INITIATING OF A PLURALITY OF DISK DRIVE GROUPS

BACKGROUND OF THE INVENTION

The present invention relates to a consumed electric power reducing system and a consumed electric power reducing method at a starting time of a disk device such as a magnetic disk and, more particularly, a power supply control system and a power supply control method to be mounted on the JBOD (Just a Bunch of Disks). Here, the JBOD is a disk system in which a plurality of disk devices are assembled in one casing so that the assembly is used as a handling unit.

In the prior art, the power supply control system of this kind is used in a power source device which is employed commonly in a plurality of hard disk drives (as will be called the "HDD").

FIG. 1 is a block diagram showing one example of a power supply control system of the prior art for the JBOD. This JBOD 20 is connected with a host system 21. The JBOD 20 includes a main power source unit 1, a DC voltage generating circuit 2, a control circuit 3 and a power supply circuit 4. The main power source unit 1 supplies the DC voltage generating circuit 2 with an AC voltage. The DC voltage generating circuit 2 generates a DC voltage from the AC voltage which is supplied from the main power source unit 1. The DC voltage thus generated by DC voltage generating circuit 2 is supplied to the power supply circuit 4. The host system 21 sends a command to the control circuit 3 through an interface 22. The control circuit 3 controls the power supply to HDDs 51 to 52 by sending a power supply circuit signal s1 to the power supply circuit 4.

Here will be described the HDD starting method which is generally utilized. In general, there are two HDD starting methods, which can be interchanged by setting the HDD.

According to a first starting method, when the HDD is supplied with the electric power, it is brought into a standby state by starting all other than the spindle motor (as will be called the "SPM"), and the SPM is raised with a command from the host system 21.

According to a second starting method (as will be called the "ordinary start"), when the HDD is supplied with the electric power, it is ordinarily started without any command from the host system 21.

Here will be described the operations. The JBOD 20 is also started by two starting methods employing the function of the HDD.

According to a first method, when the main power source unit 1 of the JBOD 20 is turned ON, the AC voltage is supplied from the main power source unit 1 to the DC voltage generating circuit 2, in which it is converted into the DC voltage. The converted DC voltage is fed to the power supply circuit 4. And, a command is sent from the host system 21 through the interface 22 to the control circuit 3 to start the individual HDDs 51 to 52 one by one. In accordance with the command received, the control circuit 3 sends the power supply circuit signal s1 to the power supply circuit 4. As a result, the SPMs in the HDDs 51 to 52 are sequentially started at the time interval which is designated by the host system 21. According to the first method, the HDDs 51 to 52 are so set that they may be started with the command from the host system 21.

According to a second method, when the main power source unit 1 of the JBOD 20 is turned ON, the AC voltage is supplied from the main power source unit 1 to the DC voltage generating circuit 2, in which it is converted into a DC voltage. This converted DC voltage is supplied to the power supply circuit 4. And, the electric power is supplied as it is from the power supply circuit 4 to all the HDDs 51 to 52 in the JBOD 20 thereby to start the SPMs simultaneously. In this second method, the HDDs 51 to 52 are so set that they are automatically started in an ordinary manner when supplied with the electric power.

However, the first and second methods thus far described have the following problems. The plurality of HDDs may be connected with the host system which does not have a function to be started with the command. In this case, the setting of the plurality of SPMs in the HDDs is made such that the SPM is automatically started after the electric power was supplied, thus causing the following problem. When the plurality of SPMs are automatically started, the consumed electric current increases to require a power source device of a high capacity. This is because the consumed electric power of the SPM takes the maximum at the starting time and because the plurality of SPMs in the JBOD are simultaneously started.

SUMMARY OF THE INVENTION

An object of the present invention is to provide a power supply system which can start an SPM in an HDD, even if a host system to be connected with a JBOD does not have a function to start the SPM in the HDD with a command, and which suppresses the increase in a consumed electric current thereby to require no power source device of a high capacity unnecessary.

According to the present invention, there is provided a power supply control system for supplying and starting a plurality of disk drive groups having at least one disk drive with an electric power. The power supply control system comprises: a power source; a plurality of power supply circuits for supplying the plurality of disk drive groups individually with the electric power from the power source; and a control circuit for controlling the plurality of power supply circuits. The control circuit generates, when the power source is turned ON, a circuit signal for turning ON the plurality of power supply circuits sequentially. The individual power supply circuits supply, when they receive the circuit signal, the corresponding disk drive groups with the electric power. Thus, the starts of the plurality of disk drive groups are made not to timely overlap.

The control circuit outputs, when a first set time elapses after it outputted the circuit signal for turning ON the power supply circuit corresponding to a certain disk drive group, the circuit signal for turning ON the power supply circuit corresponding to the next disk drive group.

On the other hand, the control circuit outputs, where the certain disk drive group did not start even with the power supply and when a second set time elapses after it outputted the circuit signal for turning ON the power supply circuit corresponding to the certain disk drive group, the circuit signal for turning the power supply circuit corresponding to the next disk drive group. The second set time is shorter than the first set time.

In a preferred aspect of the present invention, each of the disk drive groups outputs a disk drive start initialization signal when it initializes its start. In this case, the control circuit includes first timer unit, a second timer unit, a first counter unit, a first comparator and a selector unit. The first timer unit is reset with the circuit signal for turning ON the power supply circuit corresponding to a certain disk drive group, and outputs a first time lapse signal when a first reset time elapses after reset. The second timer unit is reset with the circuit signal for turning ON the power supply circuit corresponding to the certain disk drive group, and outputs a second time lapse signal before a second set time shorter than the first set time elapses after reset and where the disk drive start initialization signal is not received from the certain disk drive group. On the other hand, the first timer unit is reset with the second time lapse signal. The first counter unit increases the counted value by 1 each time when the circuit signal is inputted, and designates the number of the disk drive group to be started. The first compare unit compares, when the first and second time lapse signals are inputted, the preset maximum value of the numbers of all disk drive groups and the number of the disk drive group designated by the first counter unit, and outputs, where the number of the disk drive group designated by the first counter unit is smaller, the number of the disk drive group designated by the first counter unit as the number of the disk drive group to be next started. The selector unit outputs the circuit signal for turning ON the power supply circuit corresponding to the number of the disk drive group to be next started.

Also, according to the present invention, there is provided a power supply control method for supplying and starting a plurality of disk drive groups having at least one disk drives with an electric power. The power supply control method: initiates the start of a disk drive group; decides, if a disk drive start initialization signal is received after the start initialization and before the lapse of a first set time, whether or not a disk drive start completion signal is received after the start initialization; and decides whether or not all the disk drive groups have completed their starts, if the disk drive start initialization signal is not received before the lapse of the first set time. If the decision reveals that the reception of the disk drive start completion signal is received, it is decided whether or not all the disk drive groups have completed their starts. If the disk drive start completion signal is not received, it is decided again whether or not the disk drive start completion signal is received after the start initialization. The starts of the disk drive groups are completed if the decision reveals that all the disk drive groups completed their starts. The start of a next disk drive group initiated if the starts of all the disk drive groups are not completed. The foregoing steps are performed from the first disk drive group to the last disk drive group.

DESCRIPTION OF THE PREFERRED EMBODIMENTS

Figure 1:
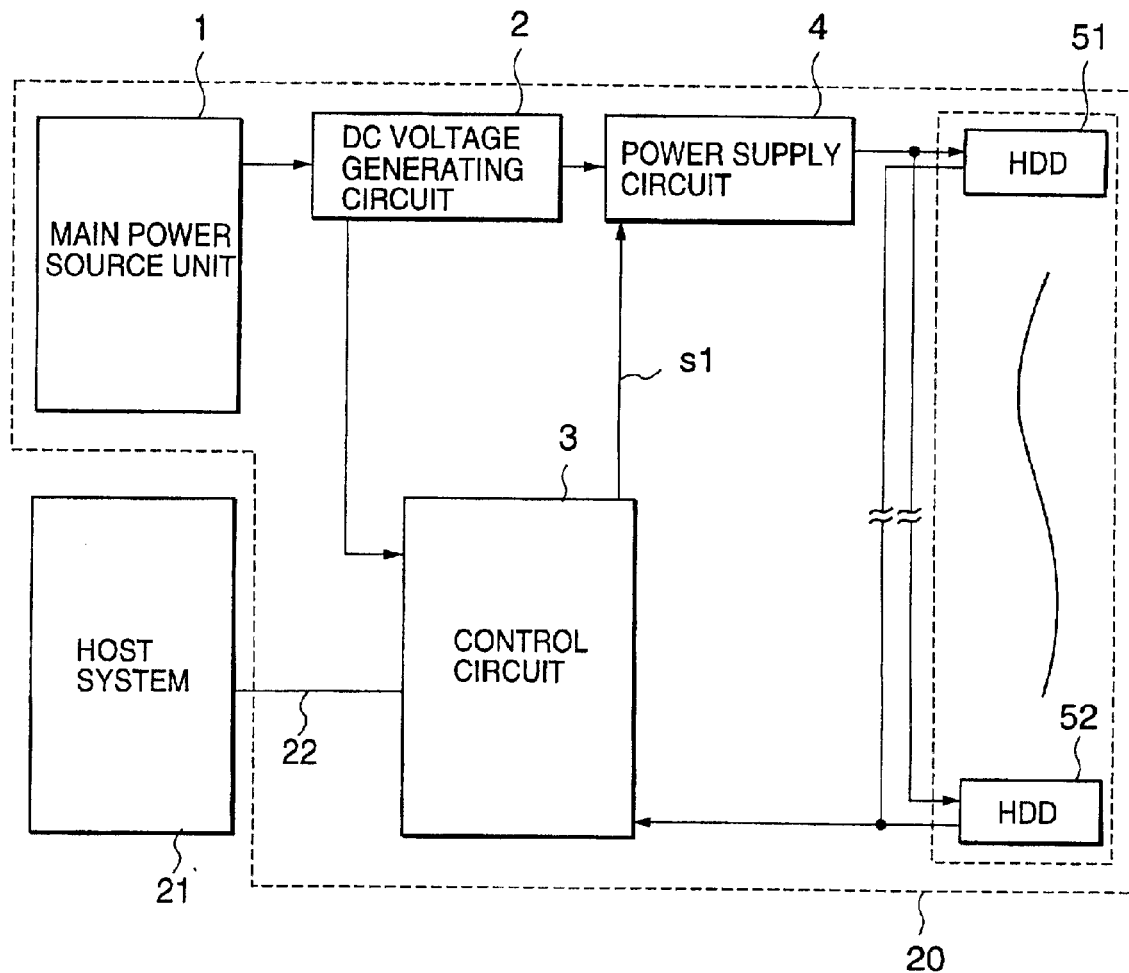
FIG. 1 is a block diagram of a power supply control system of the prior art to be applied to a magnetic disk device.
Figure 2:
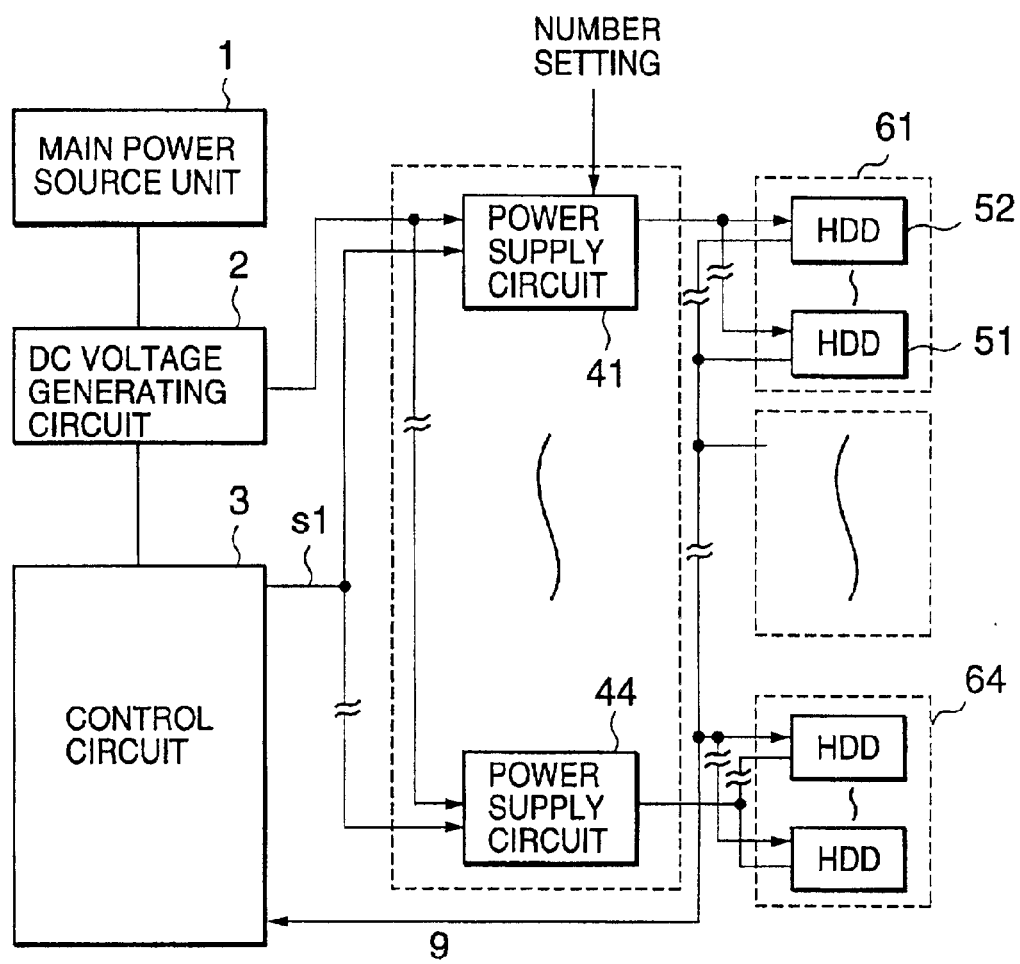
FIG. 2 is a block diagram of a power supply control system according to the present invention.

Here will be described a power supply control system for the JBOD according to the present invention with reference to FIG. 2 and FIG. 3. In FIG. 2, the same portions as those of FIG. 1 are designated by the common reference numerals. The power supply control system includes a main power source unit 1, a DC voltage generating circuit 2, a control circuit 3, a plurality of power supply circuits 41 to 44 and a plurality of HDD groups 61 to 64. Each of these HDD groups 61 to 64 is provided with an arbitrary number of HDDs 51 to 52.

Figure 3:
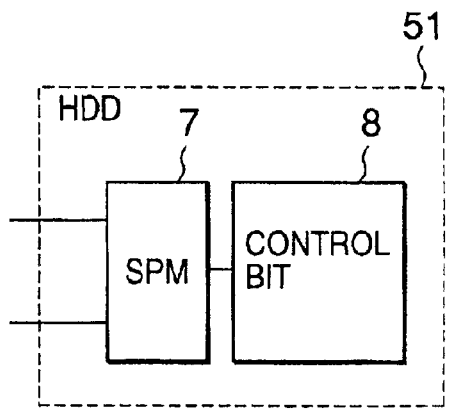
FIG. 3 is a block diagram showing a portion of the construction of an HDD shown in FIG. 2.

In FIG. 3, the HDD 51 is provided with a spindle motor (as will be called the "SPM") 7 and a control bit 8. This provision likewise applies to the remaining HDDs.

As has been described with reference to FIG. 1, the AC voltage from the main power source unit 1 is converted into a DC voltage by the DC voltage generating circuit 2. The DC voltage converted is supplied to the control circuit 3 and the power supply circuits 41 to 44. The HDD groups 61 to 64 are individually supplied with the electric power through the power supply circuits 41 to 44.

In FIG. 3, the control bit 8 can set the following two starting methods selectively. In a first starting method, the SPM 7 is automatically started when the electric power is supplied to the HDD 51. In a second starting method, the SPM 7 is not started, even if the electric power is supplied to the HDD 51, but is started in response to a command from the interface of a host system. Here, the control bit 8 is set in advance with the first starting method. This setting applies to all the HDDs. Therefore, the SPM 7 is automatically started when the electric power is supplied to the HDD groups 61 to 64.

The power supply circuits 41 to 44 are OFF before they receive an instruction from the control circuit 3, i.e., a power supply circuit signal (or a circuit signal) s1. In other words, the power supply circuits 41 to 44 do not supply the electric power to the HDD groups 61 to 64, unless they receive the power supply circuit signal s1 even if the electric power is inputted.

The control circuit 3 outputs the power supply circuit signal s1 sequentially at a time interval to the power supply circuits 41 to 44. The power supply circuit signal s1 is for designating each of the power supply circuits 41 to 44. As a result, the outputs of the power supply circuits 41 to 44 are turned ON sequentially at the time interval so that the electric power is supplied sequentially at the time interval to the HDD groups 61 to 64. And, the electric power is supplied to the SPMs in the individual HDDs so that the plurality of SPMs are automatically started sequentially at the time interval. The HDDs 51 to 52 output the start initiating and completing signals to the control circuit 3 through an interface 9.

Figure 4:
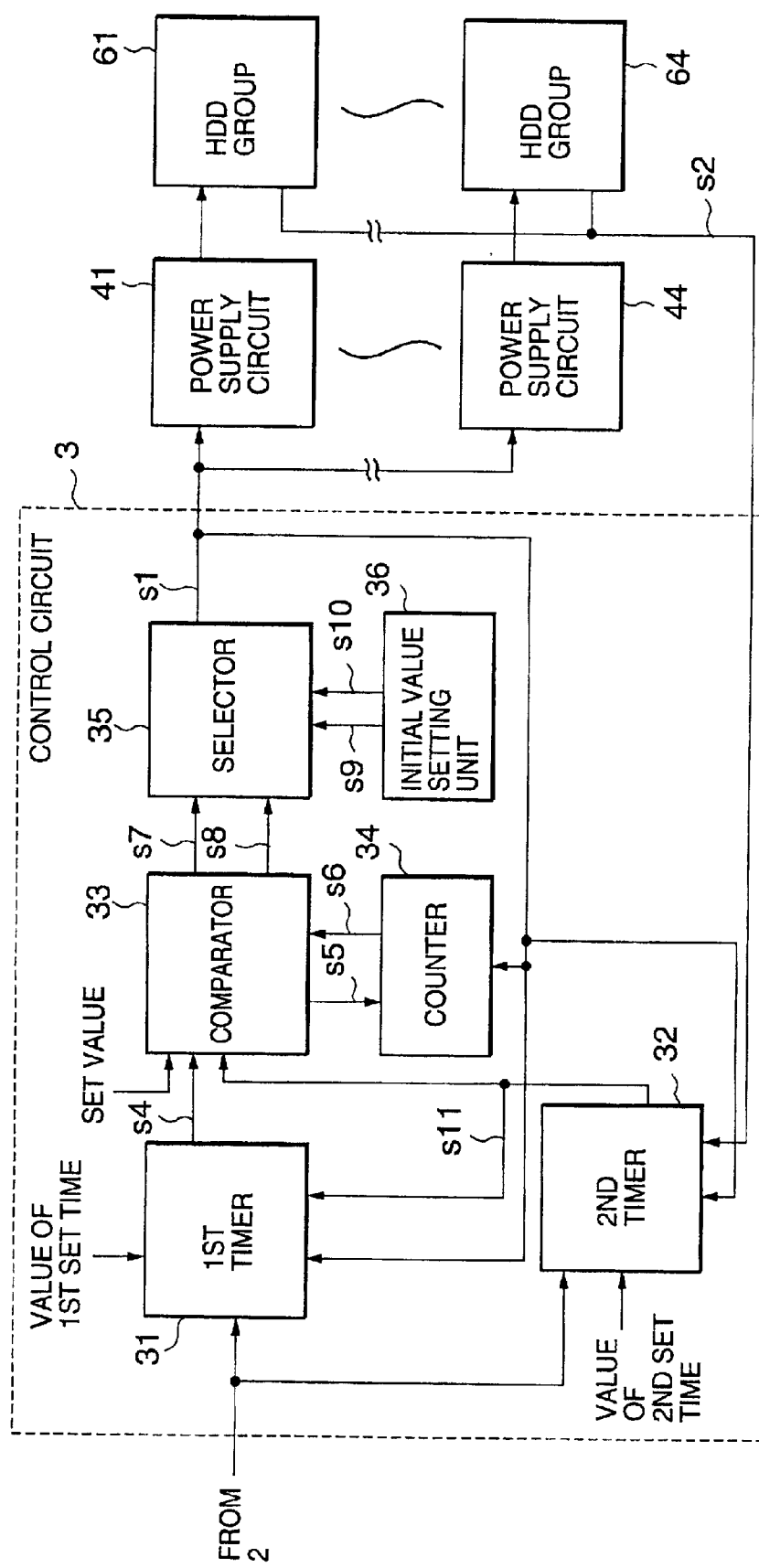
FIG. 4 is a block diagram showing a first embodiment of a control circuit shown in FIG. 2, together with its peripheral circuits.

FIG. 4 is a block diagram showing the construction of the control circuit 3 according to the first embodiment of the present invention. In FIG. 4, the control circuit 3 includes a first timer (or first timer means) 31, a second timer (or second timer means) 32, a comparator (or first compare means) 33, a counter (or first counter means) 34, an initial value setting unit 36 and a selector 35.

The first timer 31 outputs, when a preset time elapses after the operation start, a time lapse signal (or a first time lapse signal) s4 to the comparator 33. The time measuring operation of the first timer 31 is reset by either the power supply circuit signal s1 from the selector 35 or a time lapse signal (or a second time lapse signal) s11 from the second timer 32. The first timer 31 begins, after reset, a new time measurement.

The comparator 33 outputs, when it receives the time lapse signal s4 from the first timer 31 and the time lapse signal s11 from the second timer 32, a counted value demand signal s5 to the counter 34. This counter 34 counts the number of the power supply circuit signals s1 fed from the selector 35 and outputs, when it receives the counted value demand signal s5, a counted value s6 at that time to the comparator 33. This comparator 33 compares the received counted value s6 with a preset value. The comparator 33 outputs the counted value s6, when this value s6 is smaller than the preset value, as a counted value s7 to the selector 35, and outputs a next HDD group starting signal s8.

Only at the initial stage where the power source is turned ON and when the power source is stabilized, the initial value setting unit 36 sets the counted value in the selector 35 to N=1 with a counted value s10, and outputs a next HDD group starting signal s9 to the selector 35.

In the initial stage where the power source is turned ON, the selector 35 outputs the power supply circuit signal s1 designating the first power supply circuit 41 at N=1, as set by the initial value setting unit 36, and to the first timer 31, the second timer 32 and the counter 34. From now on, the selector 35 outputs the power supply circuit signal s1 designating the power supply circuit corresponding to the counted value s7 and to the first timer 31, the second timer 32 and the counter 34. The counter 34 adds 1 to the number of the power supply circuit signal s1, as has been received till then.

The first timer 31 begins the time measurement when it receives the power supply circuit signal s1. The second timer 32 begins the time measurement when it receives the power supply circuit signal s1. After this, the second timer 32 outputs the time lapse signal s11 to the comparator 33 and the first timer 31 after the lapse of a preset second set time, unless an HDD start start initialization signal s2 is sent from the HDD groups 61 to 64.

The set value of the comparator 33 is equalized to the number of the HDD groups 61 to 64 in the JBOD. The second set time of the second timer 32 is made shorter than the first set time of the first timer 31.

Figure 5:
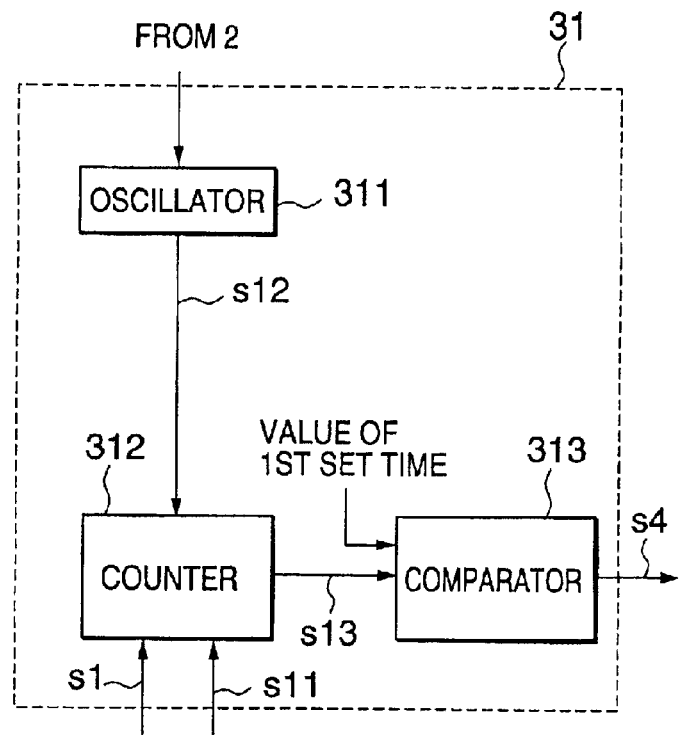
FIG. 5 is a block diagram showing the construction of a first timer shown in FIG. 4.

FIG. 5 is a block diagram showing the construction of the first timer 31 in the control circuit 3. In FIG. 5, an oscillator (or a first oscillator) 311 generates and sends, when supplied with the electric power, pulse signals s12 to a counter (or second counter means) 312 so that the counter 312 counts the number of the pulse signals s12. And, the counter 312 outputs a measured value s13 indicating the time to a comparator (or second compare means) 313. This comparator 313 compares the first set time and the measured value s13, and outputs the time lapse signal s4 to the comparator 33 when the two values are identical. The counter 312 is reset when the power supply circuit signal s1 from the selector 35 and the time lapse signal s11 from the second timer 32 are inputted to a reset terminal.

Figure 6:
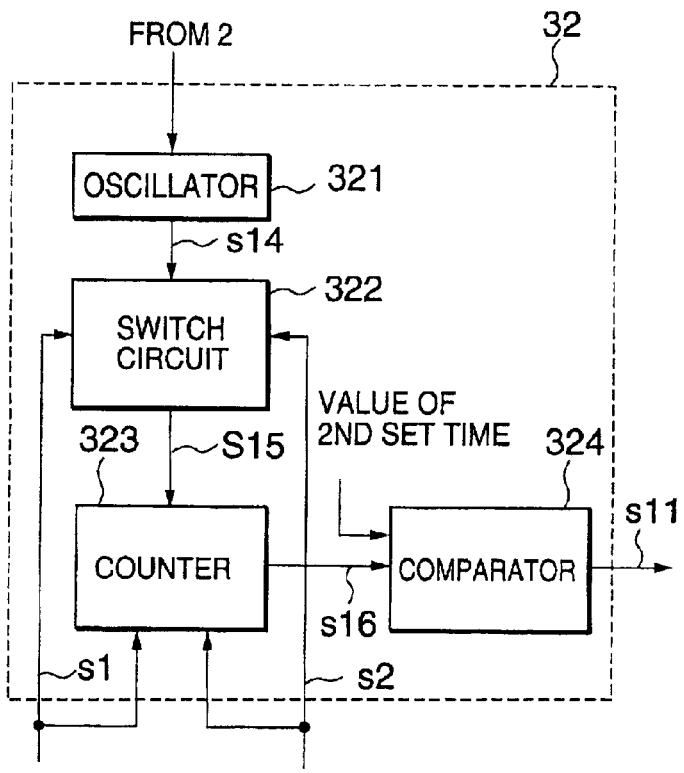
FIG. 6 is a block diagram showing the construction of a second timer shown in FIG. 4.

FIG. 6 is a block diagram showing the construction of the second timer 32 in the control circuit 3. When the electric power is supplied, as shown in FIG. 6, an oscillator (or a second oscillator) 321 generates and outputs pulse signals s14 to a switch circuit 322. This switch circuit 322 outputs, when ON, the pulse signals s14 as pulse signals s15 to a counter (or third counter means) 323. This counter 323 counts the number of the pulse signals s15 and outputs a measured value s16 indicating the time to a comparator (or third compare means) 324. This comparator 324 compares the second set time and the counted value s16. When the second set time and the measured value s16 are identical, the comparator 324 outputs the time lapse signal s11 to the comparator 33 and the first timer 31.

When the power supply circuit signal s1 from the selector 35 is inputted to the second timer 32, the switch circuit 322 is turned ON with the power supply circuit signal s1. This power supply circuit signal s1 is inputted to a reset terminal of the counter 323, too. This counter 323 resets, when the power supply circuit signal s1 is inputted, the counted value, and begins the counting operation again.

When the HDD start initiation signal s2 is inputted from the HDD groups 61 to 64 to the switch circuit 322, this switch circuit 322 is turned OFF. The HDD start initiation signal s2 is inputted to the reset terminal of the counter 323, too, thereby to reset the counter 323.

Next, the flows of the operations of the JBOD of the power supply control system of FIG. 2 and the control circuit 3 of FIG. 4 will be described with reference to the flow chart of FIG. 7.

First of all, all the HDDs 51 to 52 in all the HDD groups are set (at Step S1), without any command from the host system, to a mode in which they are started only by the voltage supply. The individual power supply circuits 41 to 44 are set (at Step S2) with the number of HDDs in the HDD groups. The power source of the JBOD is turned ON (at Step S3).

On the basis of the counted value (N=1) sent from the initial value setting unit 36 of FIG. 4, the power supply circuit signal s1 is outputted from the selector 35 to the power supply circuits 41 to 44. As a result, the electric power is supplied from the power supply circuits 41 to 44 to the HDD groups 61 to 64 so that HDD group of the N-th order (having the initial value N=1) is started (at Step S4).

When the HDD start initialization signal s2 is outputted within the second set time in the second timer 32 from the HDD groups 61 to 64 to the second timer 32, the HDD groups 61 to 64 have succeeded in their starts (that is, the answer of Step S5 is Yes) so that the routine transfers to Step S6. Where the HDD start initialization signal s2 is not inputted within the second set time to the second timer 32, on the contrary, the HDD groups have failed in their starts (that is, the answer of Step S5 is No) so that the routine transfers to Step S7.

When the HDD groups succeed in their starts, the time lapse signal s4 is outputted (at Step S6) after the lapse of the first set time to the comparator 33 so that the routine transfers to Step S7.

When the HDD groups fail in their starts, the time lapse signal s11 is sent not through the first timer 31 to the comparator 33. This comparator 33 compares the preset group numbers of the HDD groups 61 to 64 and the counted value of the counter 34. If the starts of all groups are ended, the start is ended (at Step S9). If the starts of all groups are not ended (at Step S7), on the contrary, the comparator 33 outputs the counted value s7 and the next HDD starting signal s8 to the selector 35, and the routine transfers to Step S8.

The selector 35 outputs the power supply circuit signal s1 to the counter 34 to set the value of the counter 34 to N=N+1 (at Step S8), and the routine is returned to Step S4 by outputting the power supply circuit signal s1 to the power supply circuits 41 to 44, too.

Next, the specific operations of the power supply control system of FIG. 2 will be described with additional reference to FIG. 4. When the power source is turned ON in the power supply control system of the JBOD, the electric power is supplied from the main power source unit 1 through the DC voltage generating circuit 2 to the control circuit 3 and the power supply circuits 41 to 44. However, these power supply circuits 41 to 44 are OFF so that the HDDs 51 to 52 are not supplied with the electric power and are left inactive (at Step S3).

The HDDs 51 to 52 are so set (at Step S1) in the control bit 8 that they are automatically started when supplied with the electric power, even if they do not receive the command from the host system. In the power supply circuits 41 to 44, the number of HDDs in the HDD groups is preset (at Step S2).

When the DC voltage is supplied to the control circuit 3, as shown in FIG. 4, the value "1" of the counted value s10 (N=1)and the next HDD starting signal s9 are outputted at first from the initial value setting unit 36 to the selector 35. This selector receives the counted value s10 and the next HDD starting signal s9. And, the selector 35 outputs the power supply circuit signal s1 to the power supply circuit having the number (i.e., the first) of the value of the counted value s10 and further to the counter 34, the first timer 31 and the second timer 32 (at Step S4). In response to the power supply circuit signal s1, the first timer 31 and the second timer 32 start the time measurement.

Here will be described the case in which the N-th one of the power supply circuits 41 to 44 is turned ON. As the N-th power supply circuit is turned ON, the electric power is supplied to the N-th one of the HDD groups 61 to 64. As a result, the N-th HDD group initializes its start to output the HDD start initialization signal s2 to the second timer 32. This second timer 32 interrupts the time measurement when it receives the HDD start initialization signal s2 (when the answer of Step S5 is Yes).

If the N-th HDD group neither initiates the start nor outputs the HDD start initialization signal s2, the second timer 32 outputs the time lapse signal s11 after the second set time to the comparator 33 and the first timer 31. As a result, the first timer 31 is reset, and the routine transfers to the operation (of Step S7) to check whether or not the starts of all the HDD groups are completed.

When the N-th HDD group initializes its start to output the HDD start initialization signal s2, this HDD start initialization signal s2 is inputted to the switch circuit 322, as has been described with reference to FIG. 6. When the HDD start initialization signal s2 is inputted, the switch circuit 322 is turned OFF. The HDD start initialization signal s2 is inputted to the reset terminal of the counter 323, too, so that the counter 323 resets the count (at Step S5). At this time, the first timer 31 is not reset so that it outputs the time lapse signal s4 after the lapse of the first set time to the comparator 33 (at Step S6).

When the N-th HDD group does not initialize the start so that the HDD start initialization signal s2 is not outputted, the second timer 32 outputs the time lapse signal s11 after the lapse of the second set time to the first timer 31 and the comparator 33. When the N-th HDD group initializes the start, on the contrary, the comparator 33 receives the time lapse signal s4 from the first timer 31.

Figure 8:
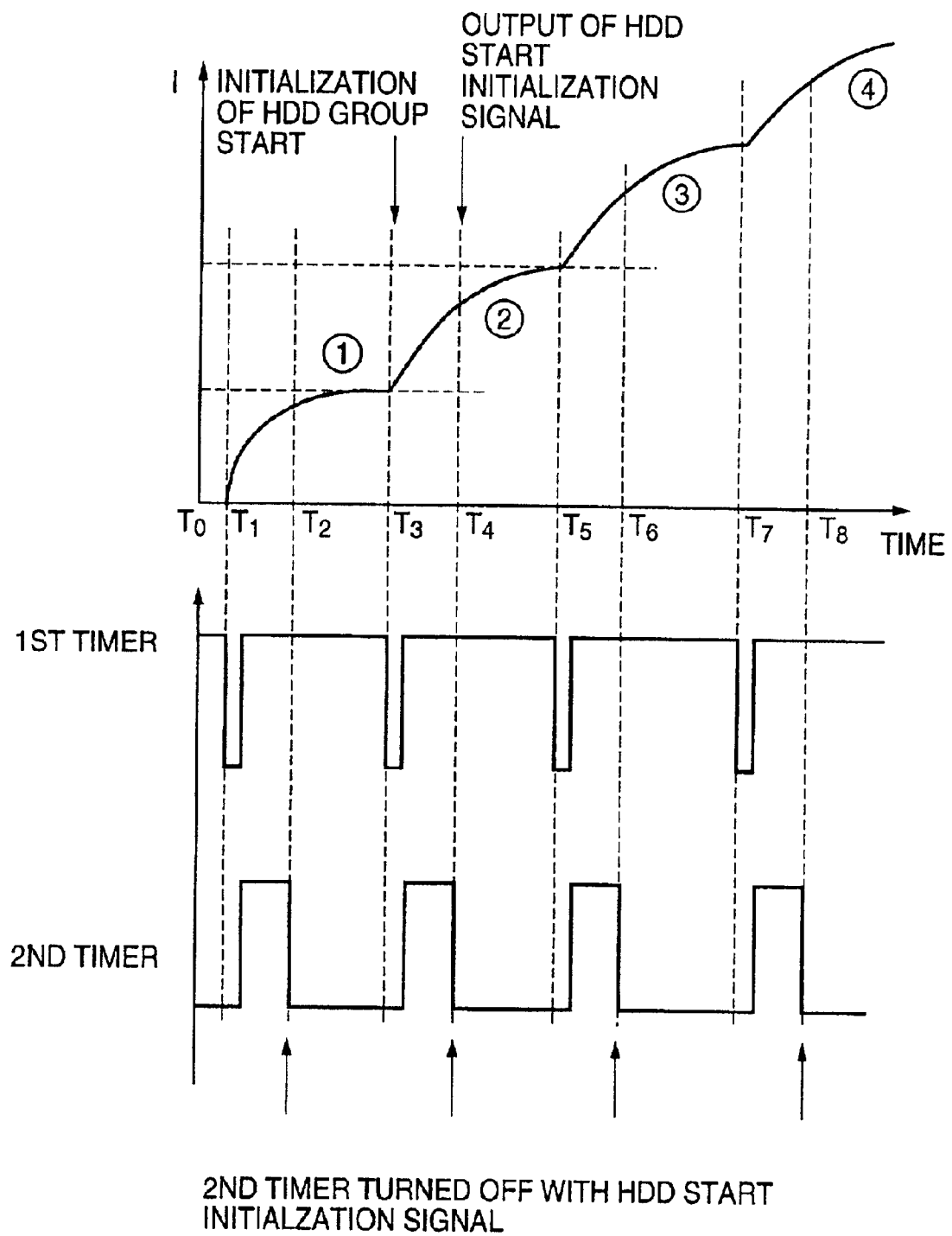
FIG. 8 is a waveform diagram for explaining the consumed electric current that a plurality of HDD groups are sequentially started by the first embodiment of the present invention.

The changes in the consumed current values accompanying the aforementioned operations will be described with reference to FIG. 8. In FIG. 8, the abscissa indicates the time, and the ordinate indicates the consumed current values. FIG. 8 illustrates the case, in which the four HDD groups initialize their proper starts sequentially at the time interval so that the consumed current values sequentially rise each time one HDD group initiates its start. When the first set time elapses at the first timer 31 so that the next HDD group initiates its start (T=T1, T3, T5 and T7), both the first timer 31 and the second timer 32 are reset and restarted. When the HDD start initialization signal s2 is outputted (T=T2, T4, T6 and T8) after the start initialization of the HDD groups, moreover, the second timer 32 is turned OFF.

Figure 9:
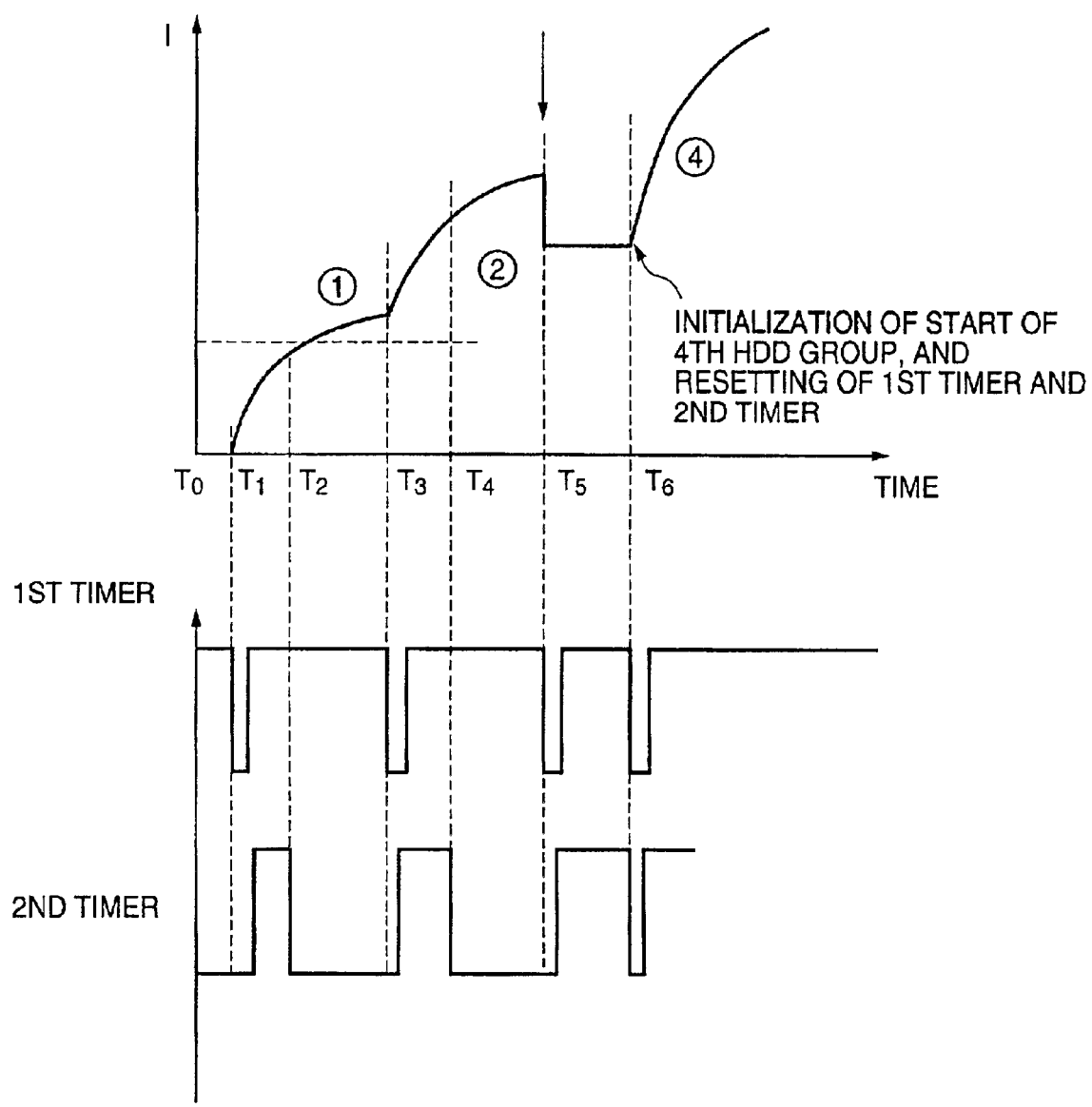
FIG. 9 is a waveform diagram for explaining the consumed electric current in the case in which one of the HDD groups has failed to start in the first embodiment of the present invention.

On the other hand, FIG. 9 illustrates an example in which the third HDD group has failed to start. As a result, when the second set time elapses in the second timer 32 (at T6) without awaiting the lapse of the first set time in the first timer 31, the fourth HDD group initializes its start. Simultaneously with this, the first timer 31 and the second timer 32 are reset to start the time measurement again.

Figure 7:
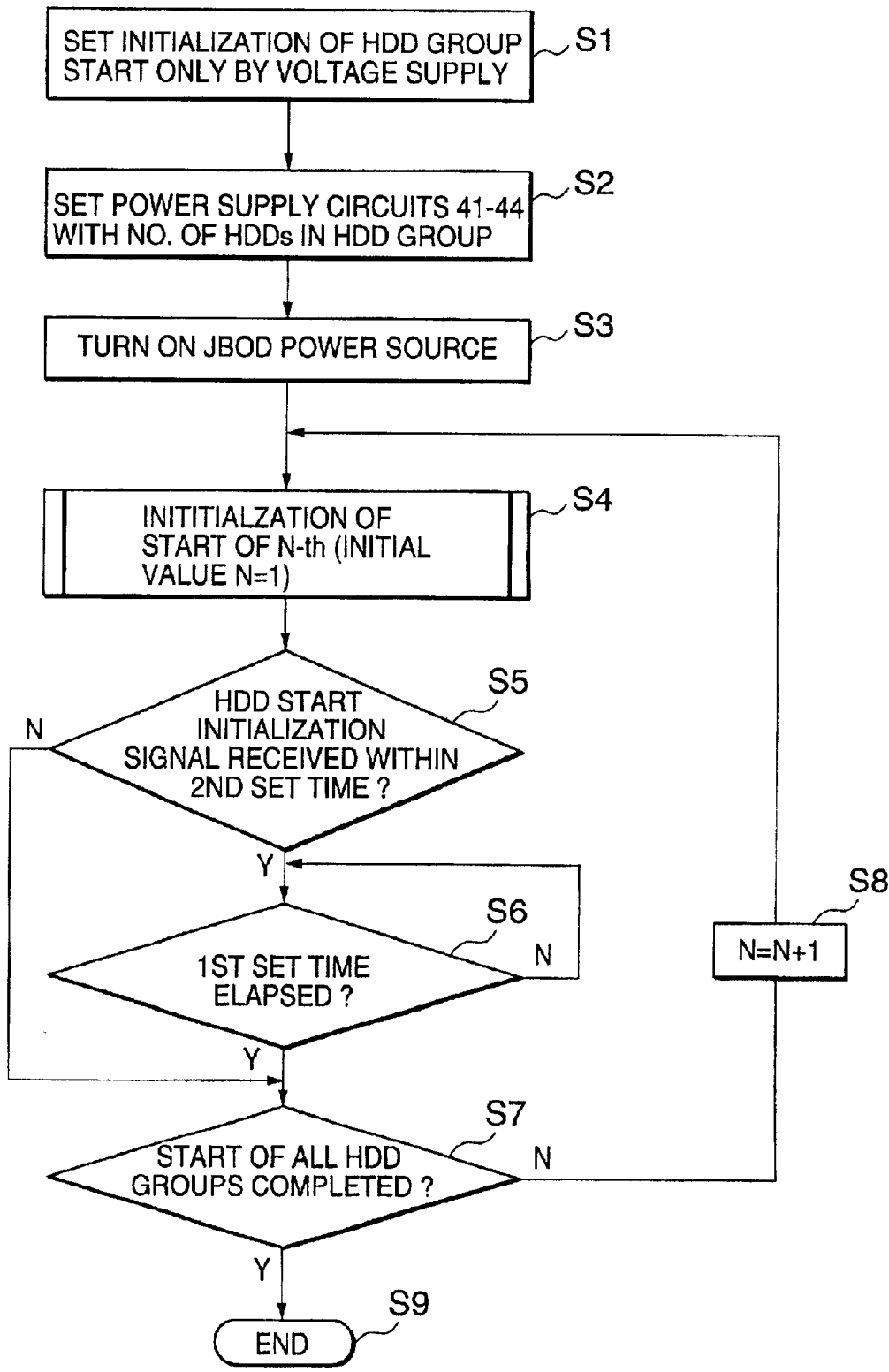
FIG. 7 is a flow chart for explaining the operations of the control circuits according to the first and second embodiments of the invention.

Turning to FIG. 4 and FIG. 7, the comparator 33 outputs the counted value demand signal s5, when it receives both the time lapse signal s11 and the time lapse signal s4, to the counter 34. When the counter 34 receives the counted value demand signal s5, it outputs the measured value s6 to the comparator 33. This comparator 33 compares the measured value s6 and the set value preset (at Step S2 of FIG. 7) on the HDD number for the individual HDD groups 61 to 64. Where the measured value s6 is smaller than the set value, the comparator 33 outputs the measured value s7 and the next HDD starting signal s8 to the selector 35. When the measured value s6 is identical to the set value, on the other hand, the comparator 33 does not output the next HDD starting signal s8 (at Step S7). As a result, the start of the JBOD is ended (at Step S9).

The selector 35 outputs (at Step S4), when it receives the next HDD starting signal s8, the power supply circuit signal s1 to the power supply circuit corresponding to the measured value s7. The power supply circuit signal s1 is outputted to the first timer 31 and the counter 34, too. As a result, the first timer 31 is reset, and the counter 34 adds 1 (N=N+1) (at Step S8)to the number of the power supply circuit signal s1, as has been inputted till then.

From now on, the operations of Step S4 to Step S8 are repeated till the measured value s6 and the set value coincide in the comparison at Step S7 by the comparator 33, that is, till the starts of all the HDD groups are completed.

Here will be described the effects of the first embodiment of the present invention. In the first embodiment of the present invention, the SPM of the HDD can be automatically started even if the host system connected with the JBOD does not have the function to start the SPM of the HDD with the command. By starting the HDD groups sequentially at every lapses of the constant time, on the other hand, the consumed current at the starting time of the JBOD can be reduced to suppress the power source capacity.

Figure 10A:
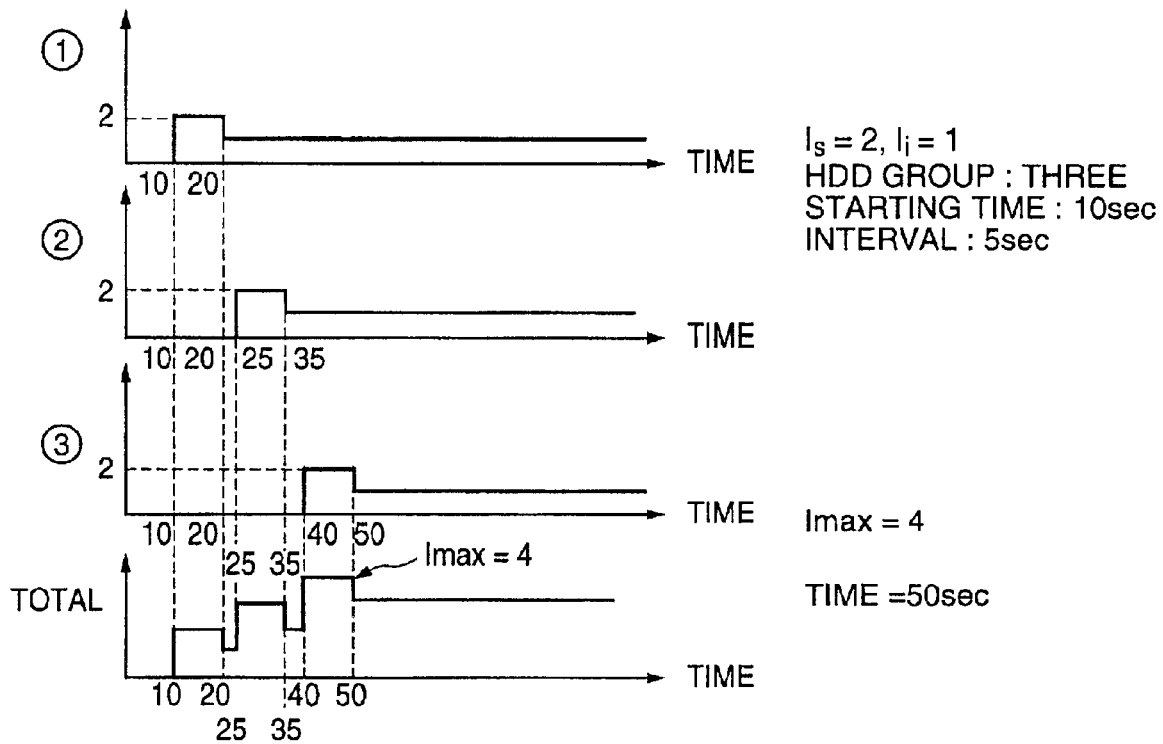
FIG. 10A and FIG. 10B are waveform diagrams for explaining the consumed electric currents where the plurality of HDD groups are sequentially started and where the plurality of HDD groups are simultaneously started.
Figure 10B:
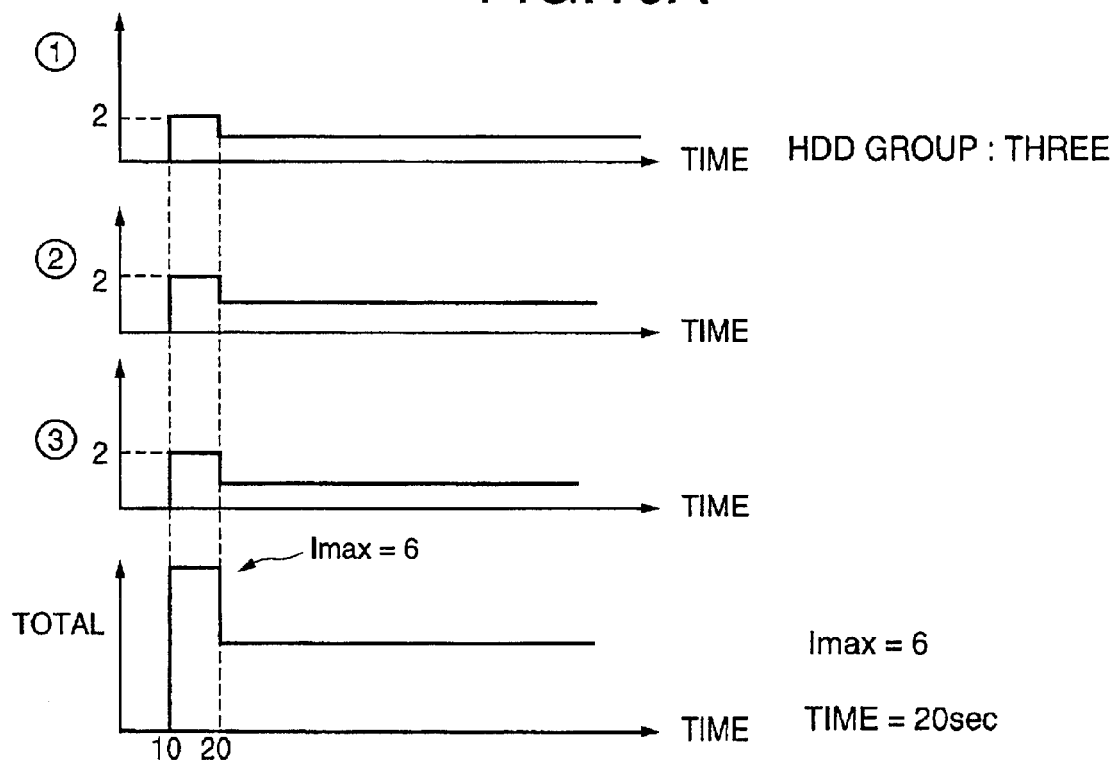

FIG. 10A and FIG. 10B illustrate the current-time characteristics of the case in which the electric current necessary for the individual HDD groups to start is Is=2 and in which the electric current necessary for the idling after the start is Ii=1. The electric current Ii necessary for the idling after the start may be smaller than the electric current Is necessary for the start. Let it be assumed that there are three HDD groups. If the three HDD groups are simultaneously started, the current value abruptly rises, as illustrated in FIG. 10B, the current maximum is Imax=6 so that the consumed electric current increases.

If the HDD groups are started sequentially for every lapses of a constant time, however, the three current waveforms are added, as shown in FIG. 10A, so that the electric current stepwise rises with the lapse of time thereby to complete the start. And, the electric current at this time takes the maximum Imax=4 so that the consumed electric current decreases.

Figure 11:
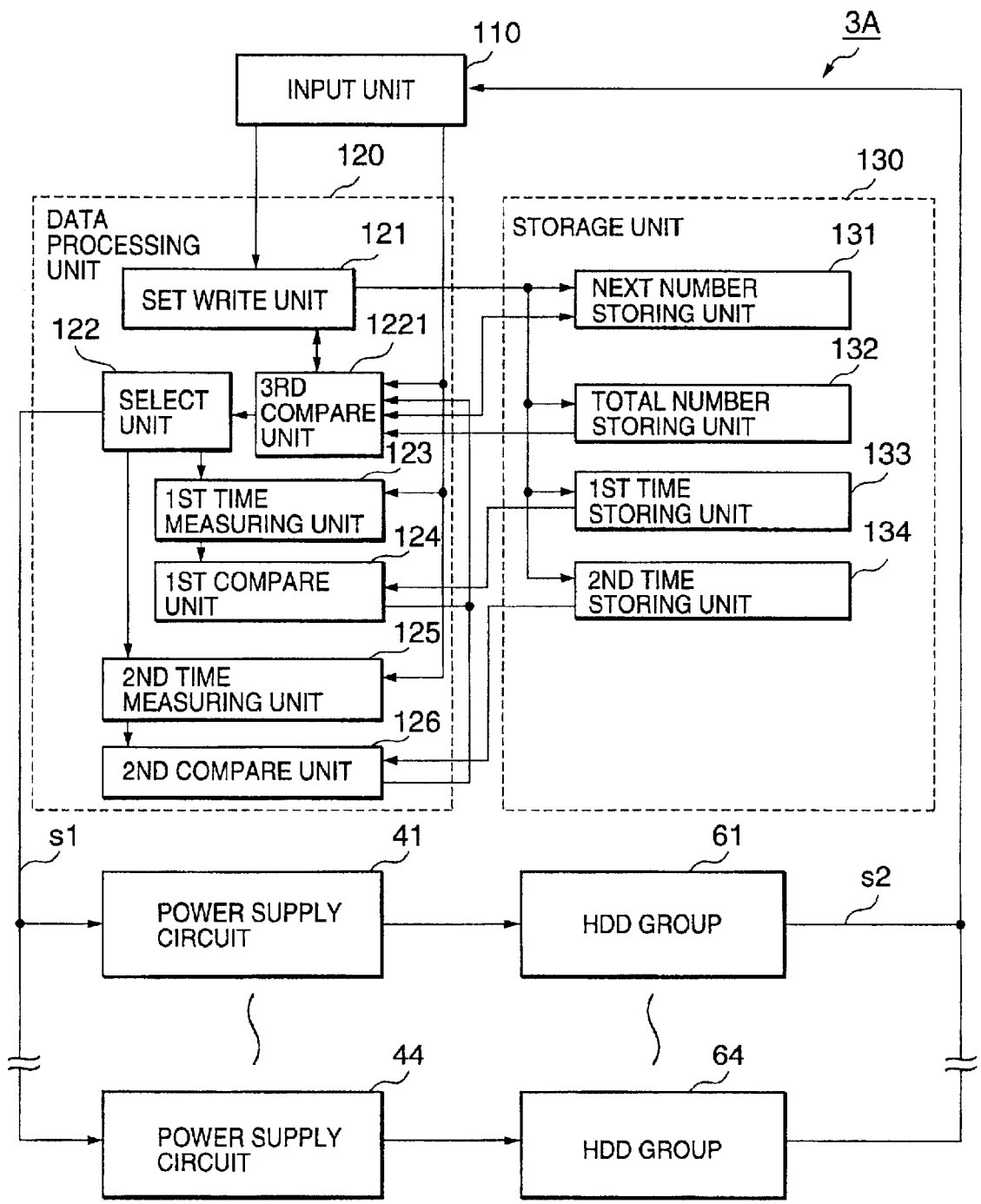
FIG. 11 is a block diagram showing a control circuit according to the second embodiment of the present invention, together with its peripheral circuits.

A control circuit according to a second embodiment of the present invention will be described with reference to FIG. 2 and FIG. 11. In FIG. 11, the main power source unit 1 and the DC voltage generating circuit 2 shown in FIG. 2 are not shown. The control circuit according to the second embodiment is different in the following points from the control circuit according to the first embodiment. Specifically, the function of the control circuit can be realized by the software. For this realization, a control circuit 3A according to the second embodiment includes an input unit 110, a data processing unit 120 activated by the program control, and a memory unit 130 for storing information.

The data processing unit 120 includes a set write unit 121, a third compare unit 1221, a select unit 122, a first time measuring unit 123, a first compare unit 124, a second time measuring unit 125 and a second compare unit 126.

The storage unit 130 includes a next number storing unit 131, a total number storing unit 132, a first time storing unit 133 for storing a first set time, and a second time storing unit 134 for storing a second set time. The next number storing unit 131 is provided for storing the number of the HDD group to be next started. The total number storing unit 132 is provided for storing the maximum of the numbers given to all the HDD groups. In other words, the individual HDD groups are given the numbers of plus integers sequentially from 1. If the number of the HDD groups is five, for example, the individual HDD groups are sequentially given the numbers of 1 to 5. Of course, the maximum is 5.

In the data processing unit 120, the set write unit 121 writes the set values, as inputted from the input unit 110, in the individual storage portions of the storage unit 130. The third compare unit 1221 compares the next HDD group number (having the initial value N=1) given from the next number storing unit 131 and the maximum number of the HDD group given from the total number storing unit 132, to decide whether or not the next HDD group number is smaller the maximum number. When the comparison in the third compare unit 1221 reveals that the next HDD group number is smaller than the maximum number of the HDD groups, the select unit 122 outputs the power supply circuit signal s1 for designating the HDD group to which the electric power is to be supplied. The power supply circuit designated with the power supply circuit signal s1 supplies the electric power to the corresponding HDD group. The HDD group, as supplied with the electric power, initializes its start to output the HDD start initialization signal s2 to the input unit 110.

When the comparison of the third compare unit 1221 ends, the next HDD group number (N=N+1) is written in the next number storing unit 131 from the input unit 110 through the set write unit 121. The third compare unit 1221 begins the aforementioned comparisons newly when it is informed of the lapse of the first set time by the first compare unit 124 and the lapse of the second set time by the second compare unit 126.

The first time measuring unit 123 begins the time measurement, simultaneously as the select unit 122 selects the next HDD group number. The measured time is compared by the first compare unit 124 with the first set time which is stored in the first time storing unit 133. If these two coincide, the first compare unit 124 informs the third compare unit 1221 of the lapse of the first set time.

The second time measuring unit 125 also starts the time measurement, simultaneously as the select unit 122 selects the next HDD group number. The measured time is compared by the second compare unit 126 with the second set time which is stored in the second time storing unit 134. If these two coincide, the second compare unit 126 informs the third compare unit 1221 of the lapse of the second set time.

The second time measuring unit 125 ends the time measurement when it is informed of the HDD start initialization from the HDD group through the input unit 110.

The next number storing unit 131 of the storage unit 130 is stored with the number of the next HDD group which is next to the HDD group having ended the start till then, and outputs that number to the third compare unit 1221. The total number storing unit 132 is stored with the maximum of the numbers given to the HDD groups 61 to 64, and gives the maximum to the third compare unit 1221. The first time storing unit 133 is stored with the time (i.e., the first set time) till the start initialization of the next HDD group, and gives that time to the first compare unit 124. The second time storing unit 134 is stored with the time (i.e., the second set time) till the start initialization of the next HDD group. This second set time is given to the second compare unit 126 if the HDD group is not started. The second set time is set shorter than the first set time. In the individual storing units 131 to 134 in the storage unit 130, there are written the necessary information from the input unit 110 through the set write unit 121.

Here will be described the operations of the second embodiment. Like the first embodiment, as shown in FIG. 2, FIG. 3, FIG. 7 and FIG. 11, the HDDs 51 to 52 are so set (at Step S1) for the control bit 8 that they are automatically started without any command from the host system if the voltage is supplied. The power supply circuits 41 to 44 are preset (at Step S2) with the number of HDDs in the corresponding HDD group.

When the power source is turned ON on the power supply control system of the JBOD, the DC voltage is supplied from the main power source unit 1 through the DC voltage generating circuit 2 to the control circuit 3A and the power supply circuits 41 to 44. However, the power supply circuits 41 to 44 are OFF so that the individual HDD groups are not supplied with the electric power and are left inactive (at Step S3).

In FIG. 11, the various set values, as given from the input unit 110, are written in the storage portions in the storage unit 130 through the set write unit 121. The third compare unit 1221 is stored in the next number storing unit 131. The next HDD group number (having the initial value N=1) to be next started and the maximum of the numbers of the HDD groups stored in the total number storing unit 132 are compared. When the next HDD group number is smaller than the maximum of the numbers of the HDD groups, the third compare unit 1221 transmits the next HDD group number to the select unit 122. In this case, the select unit 122 outputs the power supply circuit signal s1 indicating the next HDD group number to the power supply circuits 41 to 44. The power supply circuit having the number, as indicated by the power supply circuit signal s1, supplies the electric power to the corresponding HDD group. The HDD group, as supplied with the electric power, initiates the start (at Step S4).

When the comparison at the third compare unit 1221 is ended, on the other hand, the value (N=N+1) is newly written in the next number storing unit 131 through the set write unit 121. Subsequently as the first time measuring unit 123 and the second time measuring unit 125 are informed of the output of the power supply circuit signal s1 by the select unit 122, the first time measuring unit 123 and the second time measuring unit 125 initiate the time measurements.

When the start is initiated, the HDD group outputs the HDD start initialization signal s2 to the control circuit 3A. The control circuit 3A having received the HDD start initialization signal s2 informs the second time measuring unit 125 of the success of the start of the HDD group by the input unit 110. At this time, the second time measuring unit 125 ends the time measurement (if the answer of Step S5 is Yes).

When the HDD group cannot initiate the start so that the HDD start initialization signal s2 is not outputted, the second time measuring unit 125 continues the time measurement. Therefore, the measured time of the second time measuring unit 125 is compared by the second compare unit 126 with the second set time which is stored in the second time storing unit 134. When these two coincide, this coincidence is transmitted to the third compare unit 1221 so that the routine transfers to the start of the next HDD group (if the answer of Step S5 is No).

When the HDD group is started, the first compare unit 124 compares the measured time of the first time measuring unit 123 and the first set time stored in the first time storing unit 133. When these two coincide, the third compare unit 1221 is informed of this coincidence (at Step S6).

The second compare unit 1221 compares, when the lapses of the individual set times are transmitted from the first compare unit 124 or the second compare unit 126, the value of the next number storing unit 131 (i.e., the next HDD group number) and the value of the total number storing unit 132 (i.e., the maximum of the HDD group numbers). Where the comparison results in that the value of the next number storing unit 131 is smaller than the value of the total number storing unit 132, the third compare unit 1221 informs the select unit 122 of the next HDD group number (at Step S7).

At this time, the new value (N=N+1) is written (at Step S8) in the next number storing unit 131 by the third compare unit 1221 through the set write unit 121 (at Step S8).

The select unit 122 outputs the power supply circuit signal s1 indicating the next HDD group number to the power supply circuits 41 to 44. The power supply circuit having the number indicated by the power supply circuit signal s1 supplies the electric power to the corresponding HDD group to initiate the start (at Step S4).

From now on, similar operations are repeated till the coincidence at Step S7 between the value of the next number storing unit 131 and the value of the total number storing unit 132. When these two coincide, the operations are ended (at Step S9).

Figure 12:
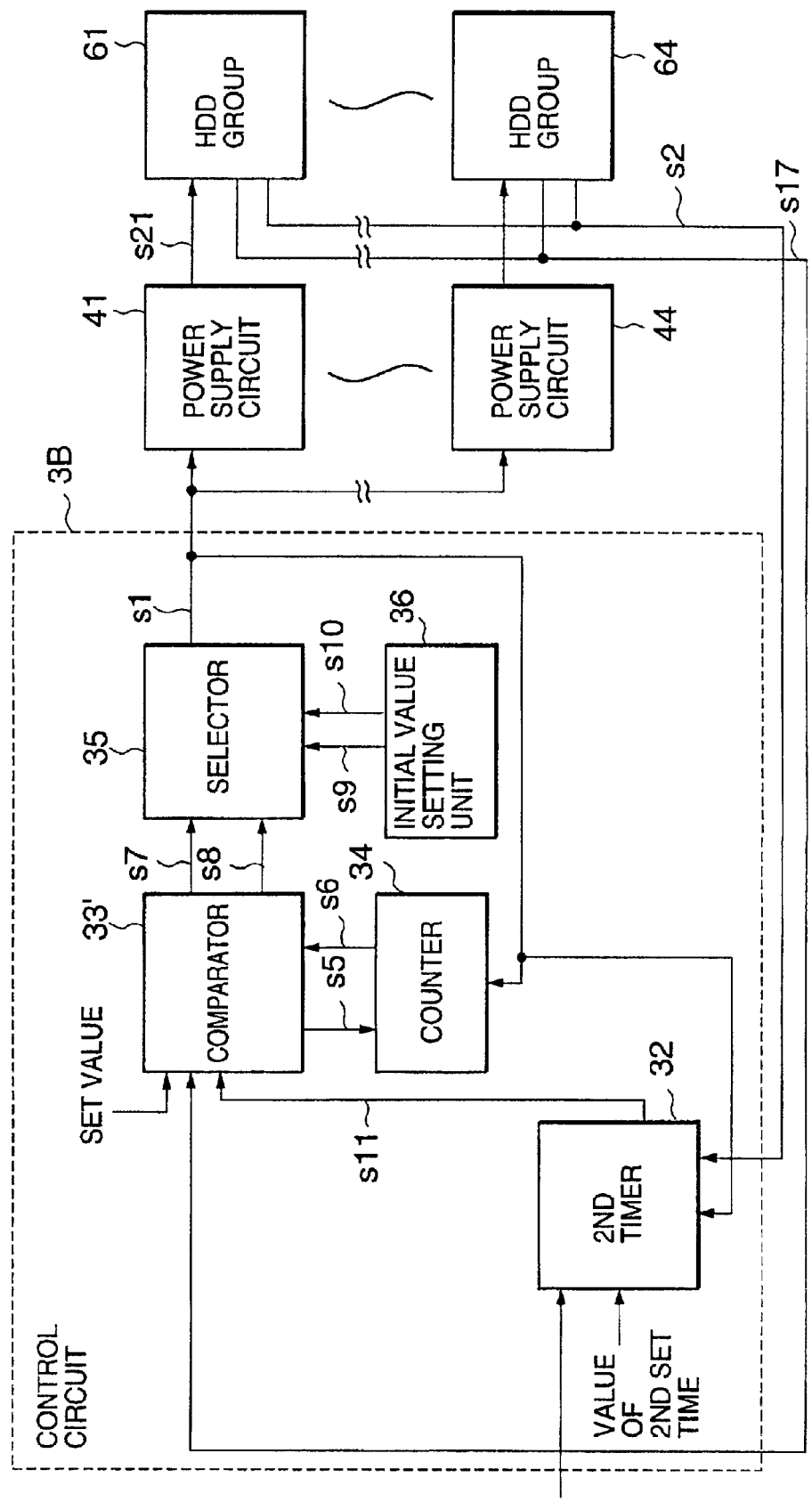
FIG. 12 is a block diagram showing a control circuit according to a third embodiment of the present invention, together with its peripheral circuits.
Figure 13:
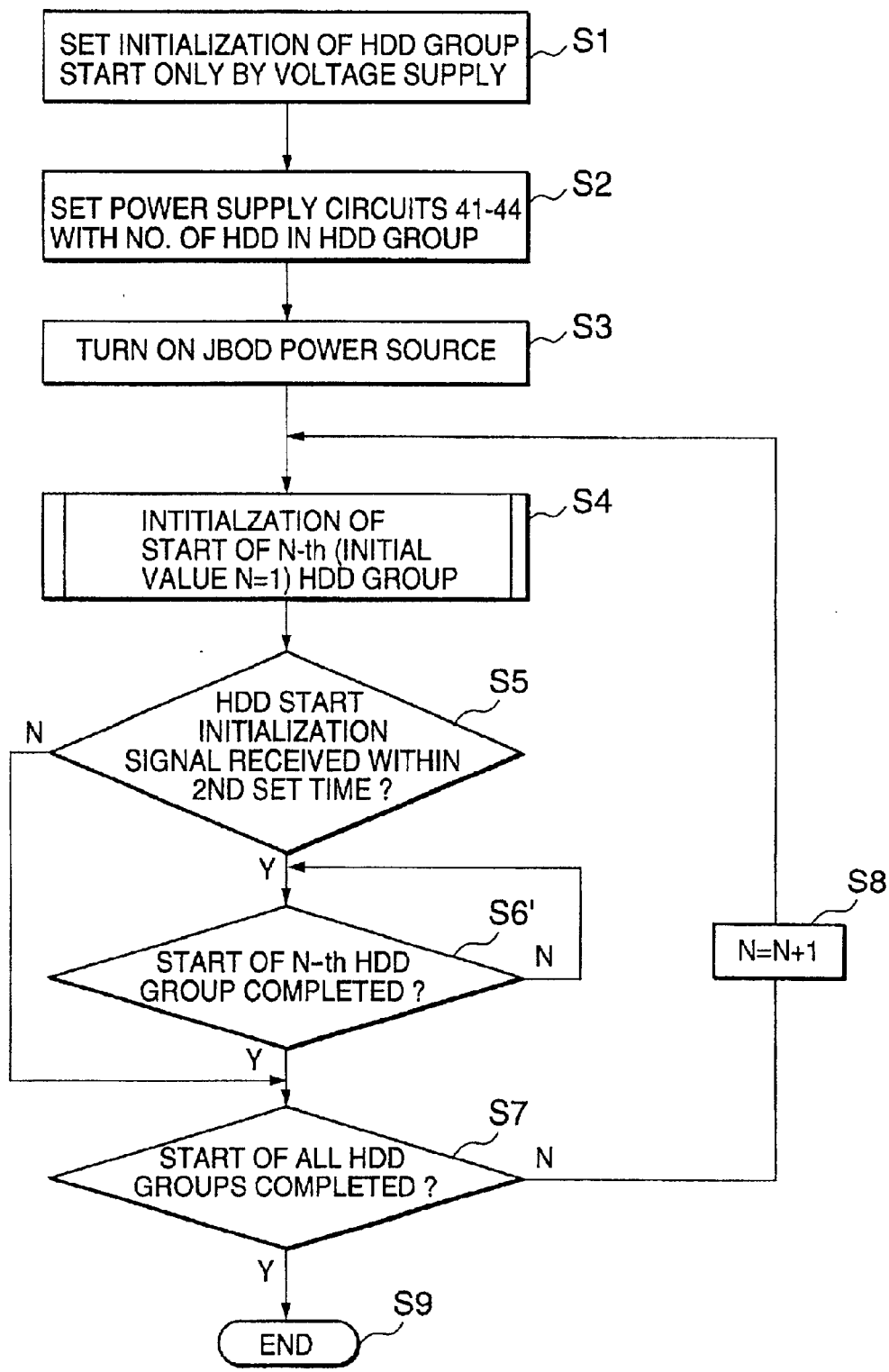
FIG. 13 is a flow chart for explaining the operations of the control circuit according to the third embodiment of the present invention.

Next, the power supply control system using a control circuit according to a third embodiment of the present invention will be described with reference to FIGS. 12 to 14. In FIG. 12, too, the main power source unit 1 and the DC voltage generating circuit 2 shown in FIG. 2 are not shown. In the third embodiment, the plurality of HDD groups are not started sequentially at a constant interval, but the start of an HDD group is completed, and the next HDD group initiates its start. Therefore, the third embodiment is different in the following points from the first embodiment shown in FIG. 4. From the third embodiment, 1,1there are eliminated the first timer 31 shown in FIG. 4 and its associated signals. In place of these, a comparator 33' receives an HDD start completion signal s17, as generated at the start completion time, from the HDD groups 61 to 64.

If the comparator 33' receives the HDD start completion signal s17 (at Step S6' of FIG. 13) as in the case where the time lapse signal s4 (as referred to FIG. 4) outputted from the first timer 31 is inputted in the first embodiment, the comparator 33' outputs the counted value demand signal s5 to the counter 34. From now on, a control circuit 3B acts as in the first embodiment. In other words, simultaneously as the start of an HDD group is completed, there are executed the operations for starting the next HDD group.

The comparator 33' executes the operations for starting the next HDD group, too, when it receives not the HDD start completion signal s17 because of a failure in the start of the HDD group but the second time lapse signal s11 from the second timer 32. Here, the second set time of the second timer 32 in this embodiment is made shorter than the time necessary for starting one HDD group.

Here will be described the effects which are intrinsic to the third embodiment. In the third embodiment, as shown at Step S6' of FIG. 13, the start of a next HDD group is not executed before the start of an HDD group is confirmed, so that the starts of the HDD groups do not overlap. Therefore, it is possible to eliminate an increase in the consumed electric current, as might otherwise be caused when the plurality of HDD groups overlap.

Figure 14:
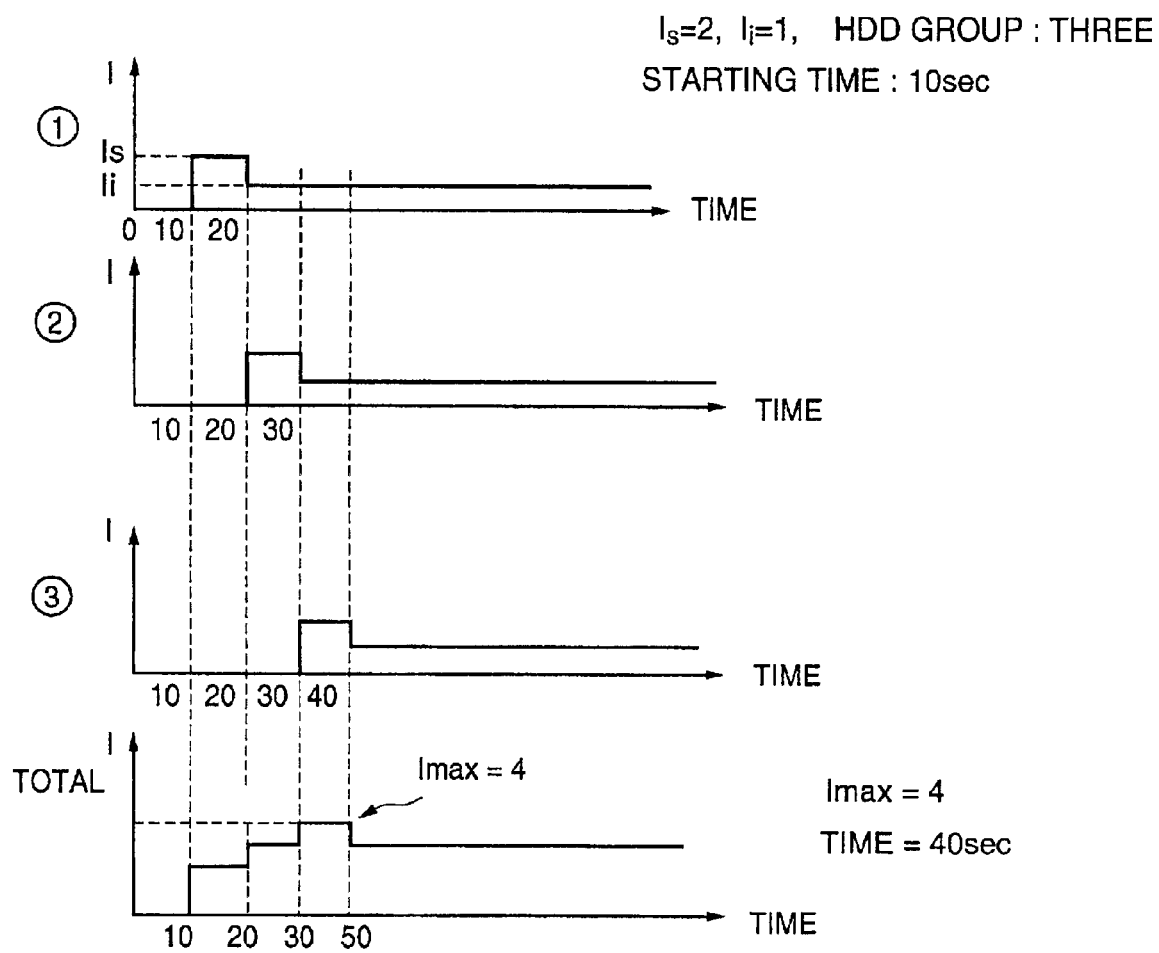
FIG. 14 is a waveform diagram for explaining the consumed electric currents in a plurality of HDD groups in the case in which the control circuit according to the third embodiment of the present invention is employed.

With reference to FIG. 14, the starts of all HDD groups can be completed within the shortest time period, as compared with the example of FIG. 10A, when the starts of the HDD groups are made not to overlap.

Figure 15:
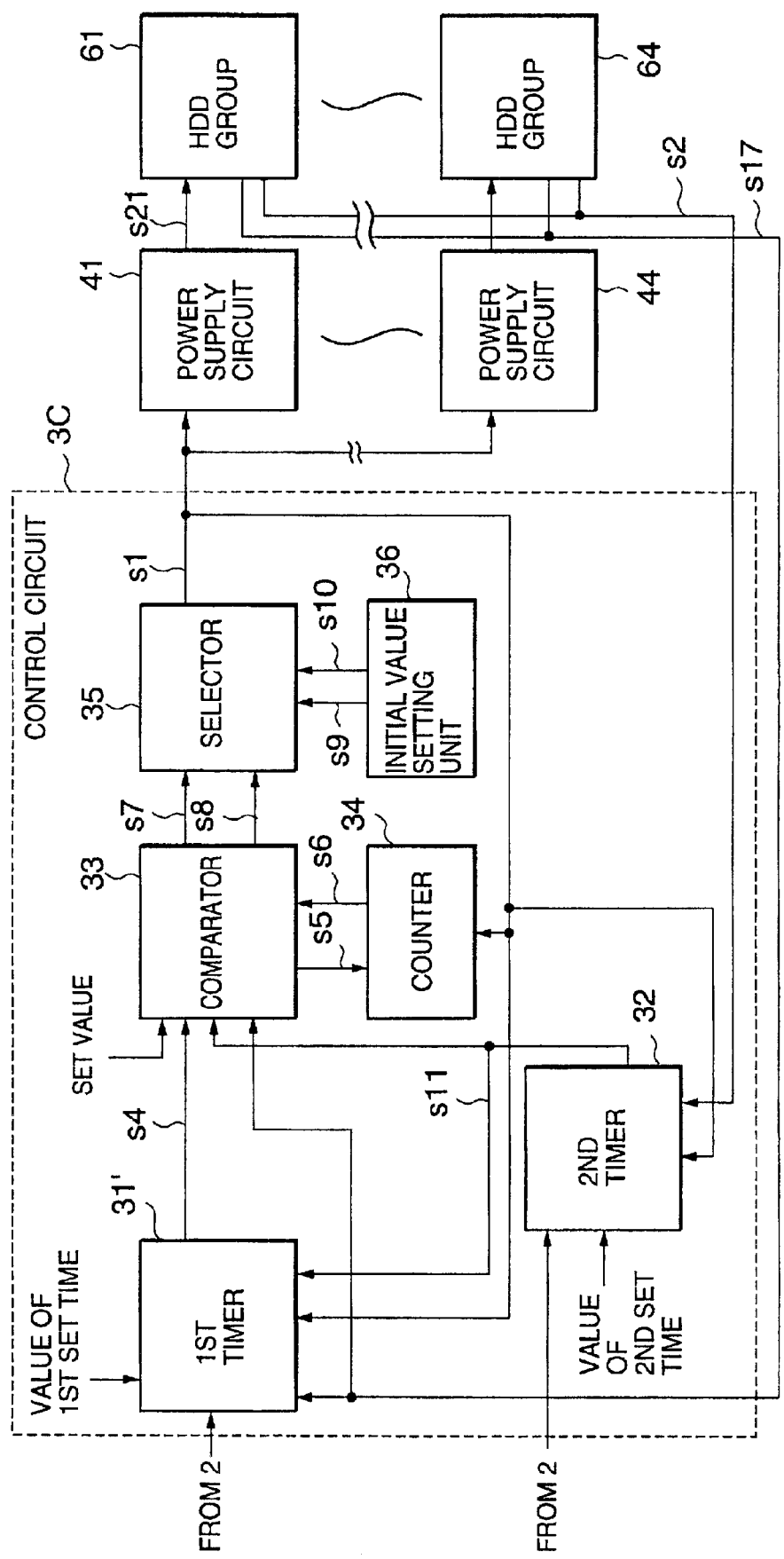
FIG. 15 is a block diagram showing a control circuit according to a fourth embodiment of the present invention, together with its peripheral circuits.

A power supply control system using the control circuit according to a fourth embodiment of the present invention will be described with reference to FIGS. 15 to 17. In FIG. 15, too, the main power source unit 1 and the DC voltage generating circuit 2 shown in FIG. 2 are not shown. The fourth embodiment is different in the following points from the first and third embodiments. In the first embodiment, the HDD groups are started at the constant time interval. In the third embodiment, the next HDD group is not started before the start of an HDD group is completed. In the fourth embodiment, the earlier one of the constant time interval and the start completion of an HDD group is selected to start the next HDD group.

In this control circuit 3C, as shown in FIG. 15, the HDD start completion signal s17 described with reference to FIG. 12 is added to the control circuit 3 according to the first embodiment shown in FIG. 4. The HDD start completion signal s17 is inputted to a first timer 31' and the comparator 33.

Figure 16:
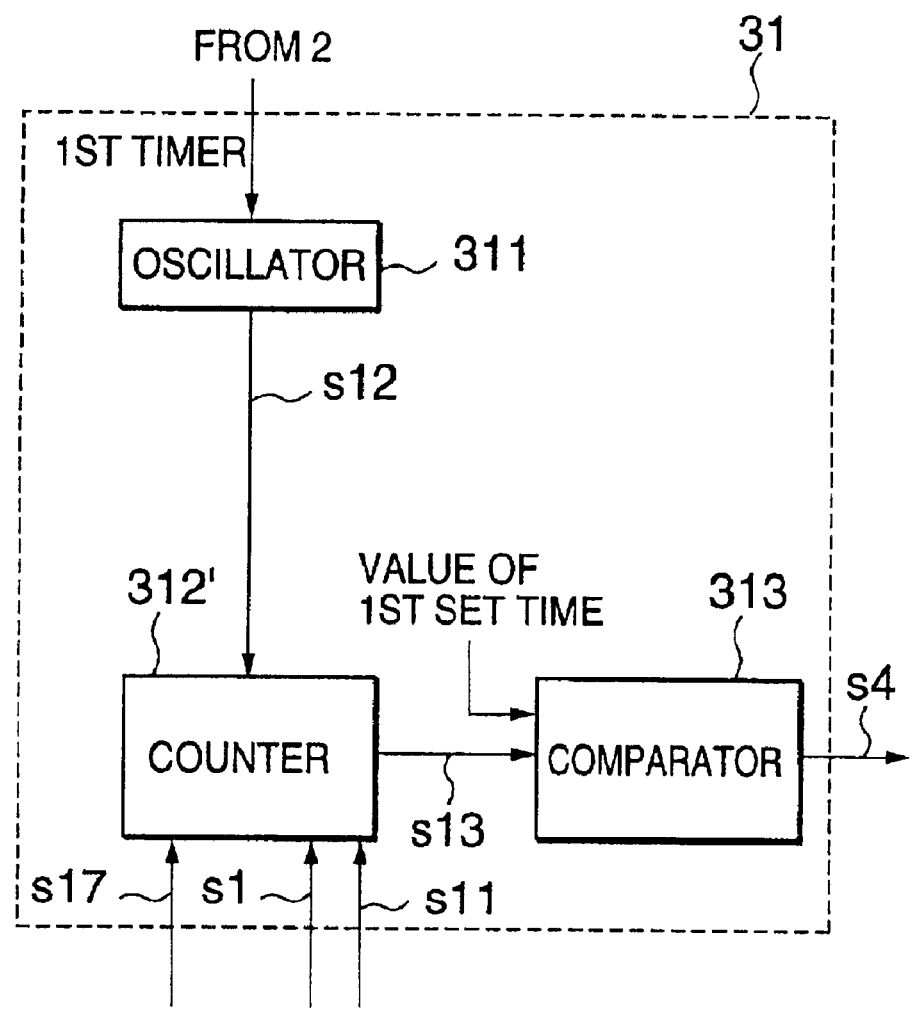
FIG. 16 is a block diagram showing the construction of a first timer shown in FIG. 15.

In FIG. 16, the first timer 31' in the fourth embodiment is different in the following points from the first timer 31 of the first embodiment shown in FIG. 5. The HDD start completion signal s17 is added as an input to a counter (or second counter means) 312'. This counter 312' is reset when the HDD start completion signal s17 is inputted.

The operations of the fourth embodiment will be described with reference to FIG. 15 and FIG. 17. It is assumed that an N-th HDD group does not complete its start by the time of the lapse of a first set time after the N-th HDD group was started so that the HDD start completion signal s17 is not outputted (that is, the answer of Step S6-1 is No, and the answer of Step S6-2 is Yes). In this case, the time lapse signal s4 is outputted from the first timer 31' to the comparator 33. In response to the time lapse signal s4, the comparator 33 checks (at Step S7) whether or not all the HDD groups have completed their starts. From now on, the control circuit 3C acts as in the first embodiment.

When the start of the N-th HDD group is completed (that is, where the answer of Step S6-1 is Yes) before the lapse of the first set time after the N-th HDD group was started, to that the HDD start completion signal s17 is outputted, the HDD start completion signal s17 is inputted to the first timer 31' and the comparator 33. As a result, the first timer 31' is reset with the HDD start completion signal s17, and the routine transfers to the step at which the time is measured with respect to the next HDD group. The comparator 33 outputs the counted value demand signal s5 to the counter 34. From now on, there are executed operations similar to those of the first embodiment.

Thus according to this embodiment, the earlier one of the constant time interval and the start completion of an HDD group can be selected to start the next HDD group by executing Steps S6-1 and S6-2.

Figure 17:
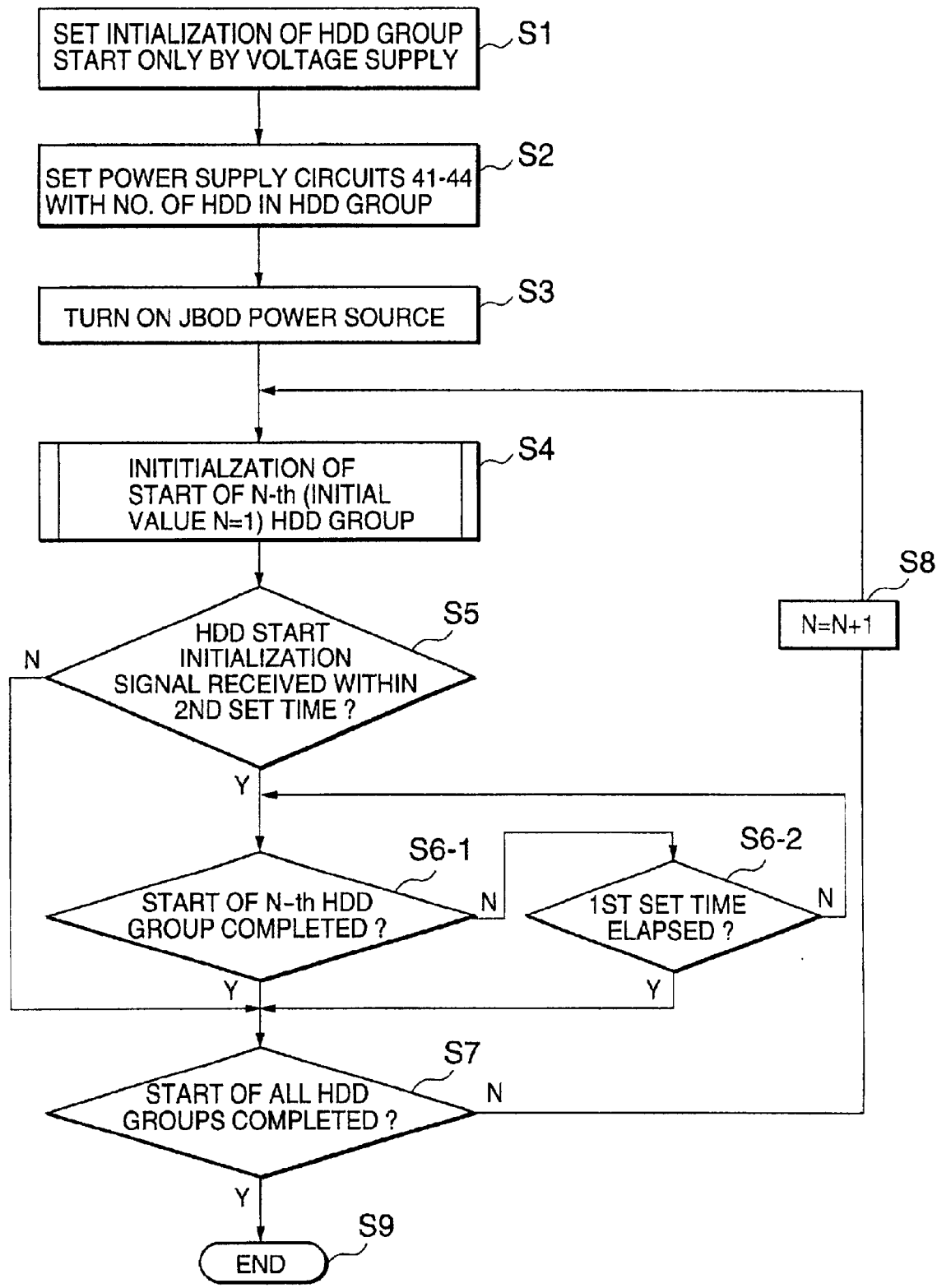
FIG. 17 is a flow chart for explaining the operations of the fourth and fifth embodiments of the present invention.
Figure 18:
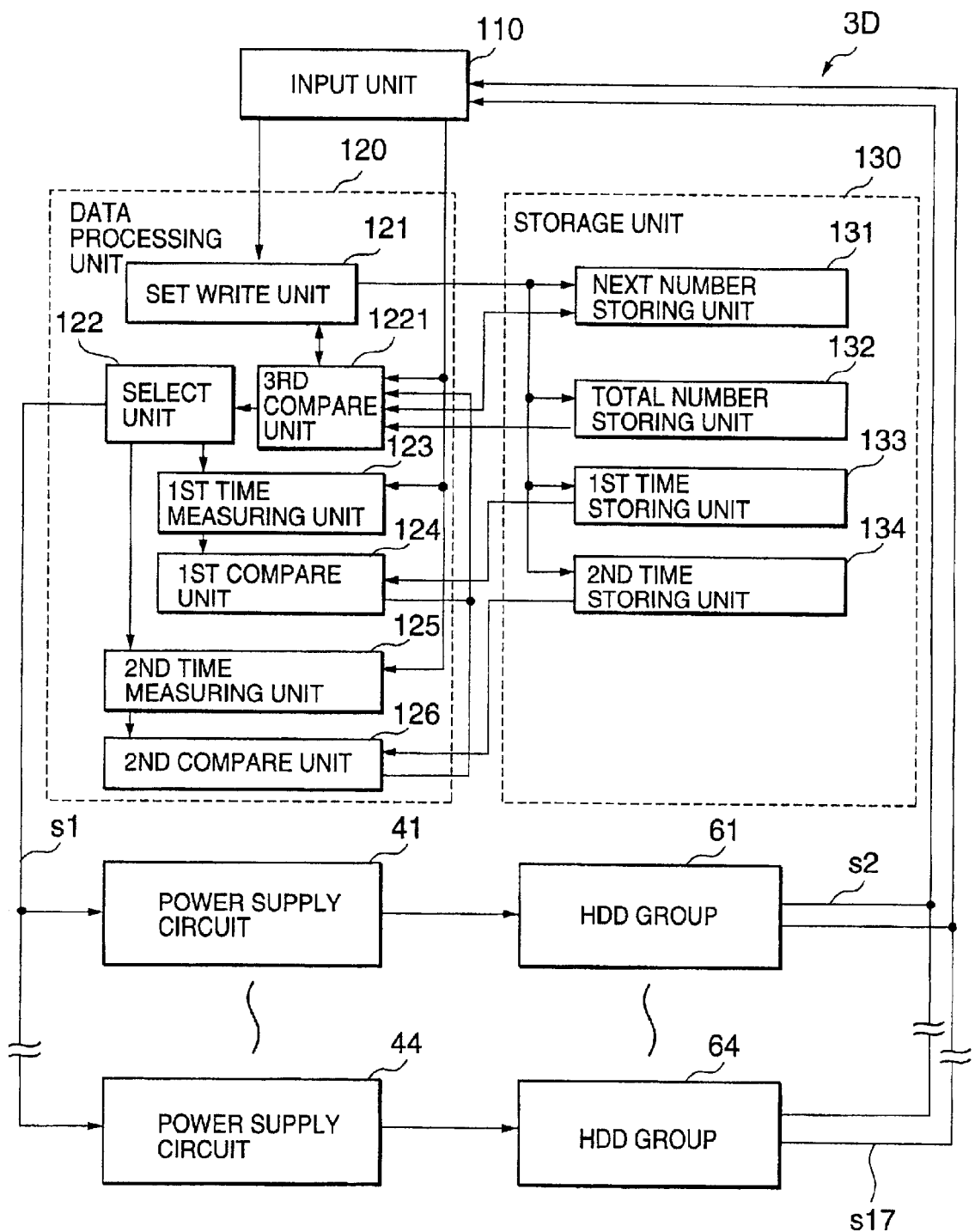
FIG. 18 is a block diagram showing a control circuit according to a fifth embodiment of the present invention, together with its peripheral circuits.

With reference to FIG. 18, here will be described a power supply control system using a control circuit according to a fifth embodiment of the present invention. In FIG. 18, too, the main power source unit 1 and the DC voltage generating circuit 2 shown in FIG. 2 are not shown. This fifth embodiment performs a routine similar to that of the fourth embodiment. In short, the operations of this embodiment are identical to those described with reference to FIG. 17. However, this embodiment is different from the fourth embodiment in that a control circuit 3D is operated by the software. The control circuit 3D according to this embodiment is also different in the following points from the control circuit 3A according to the second embodiment shown in FIG. 11. The input unit 110 receives not only the HDD start initialization signal s2 from the HDD groups 61 to 64 but also the HDD start completion signal s17. In other words, the HDD groups 61 to 64 output not only the HDD start initialization signal s2 but also the HDD start completion signal s17.

In this control circuit 3D, as in the fourth embodiment, there is selected the earlier one of the method, in which a next HDD group is started after the lapse of a set constant time, and the method in which the next HDD group is started after the start of an HDD group was completed.

With reference to FIG. 17, in this embodiment, where the start of the next HDD group when an HDD group completes its start is earlier (that is, where the answer of Step S6-1 is Yes) than the start of the next HDD group after the lapse of a constant time, the input unit 110 sends the HDD start completion signal s17 to the third compare unit 1221, the first time measuring unit 123 and the second time measuring unit 125. In this case, the third compare unit 1221 compares the values of the next number storing unit 131 and the total number storing unit 132 (at Step S7). On the other hand, the first time measuring unit 123 and the second time measuring unit 125 reset the time measurements and start the time measurements on the start of the next HDD group (at Steps S8 and S4).

When the first set time elapsed before the HDD group completes the start, the next HDD group is started (that is, where the answer of Step S6-1 is No and where the answer of Step S6-2 is Yes), and operations similar to those of the fourth embodiment are then performed. Here, the second set time of the second time measuring unit 125 is made shorter than both the first set time of the first time measuring unit 123 and the time for one HDD group to start.

Although the present invention has been described on its several embodiments on the case where it is applied to the HDD, its application should not be limited to the HDD but could be made to a power supply system for another disk drive.

A first effect of the present invention is that the SPM of the HDD can be started even if the host system to be connected with the JBOD does not have a function to start the SPM of the HDD with a command through the interface. This is because the control circuit of the power supply control system can start the SPM of the HDD.

A second effect of the present invention is that the electric current to be consumed at the starting time of the JBOD can be reduced to suppress the power source capacity. This is because all the HDD groups are not simultaneously started but are individually started sequentially.

What is claimed is:

1. A power supply control system for supplying electric power to and starting a plurality of disk drive groups having at least one disk drive, comprising:

a power source;

a plurality of power supply circuits for supplying said plurality of disk drive groups individually with the electric power from said power source; and a control circuit for controlling said plurality of power supply circuits.

wherein said control circuit generates, when said power source is turned ON, a circuit signal for turning ON said plurality of power supply circuits sequentially, wherein said individual power supply circuits supply, when they receive said circuit signal, the corresponding disk drive groups with the electric power so that the starts of said plurality of disk drive groups do not overlap in time.

wherein said control circuit outputs, when a first set time elapses after said control circuit outputs the circuit signal for turning ON the power supply circuit corresponding to a certain disk drive group, the circuit signal for turning ON the power supply circuit corresponding to a next disk drive group, wherein each of said disk drive groups outputs a disk drive start initialization signal when each of said disk drive groups initializes its start, and wherein said control circuit includes:

a first timer circuit, which resets with the circuit signal for turning ON the power supply circuit corresponding to a certain disk drive group, for outputting a first time lapse signal when said first set time elapses after reset;

a second timer circuit, which resets with the circuit signal for turning ON the power supply circuit corresponding to said certain disk drive group, for outputting a second time lapse signal before a second set time which is shorter than said first set time elapses after reset and where said disk drive start initialization signal is not received from said certain disk drive group, said first timer circuit being reset with said second time lapse signal;

a first counter circuit, which increases a counted value by one (1) each time said circuit signal is inputted, for designating a number of a disk drive group to be started;

a first compare circuit for comparing, when said first time lapse signal and said second time lapse signal are inputted, a preset maximum number of disk drive groups and the number of the disk drive group designated by said first counter means, to output, where the number of the disk drive group designated by said first counter means is smaller than said preset maximum, the number of the disk drive group designated by said first counter circuit as the number of the disk drive group to be started next; and a selector circuit for outputting the circuit signal for turning ON the power supply circuit corresponding to the number of said disk drive group to be started next.

2. A power supply control system according to claim 1, wherein said first timer circuit includes:

a first oscillator for outputting pulse signals when said power source is turned ON;

a second counter circuit, which resets with an input of at least one of the circuit signal from said selector circuit and said second time lapse signal from said second timer circuit, for counting said pulse signals from zero (0); and a second compare circuit for comparing a counted value of said second counter circuit with a set value set as said first set time, to output, when they coincide, a time lapse signal as said first time lapse signal.

3. A power supply control system according to claim 1, wherein said second timer circuit includes:

a second oscillator for outputting pulse signals when said power source is turned ON;

a switch circuit which is turned ON when the circuit signal from said selector means is inputted, and OFF when the disk drive start initialization signal from said disk drive group is inputted;

a third counter circuit, which resets with an input of at least one of the circuit signal from said selector circuit and the disk drive start initialization signal from said disk drive group, for counting said pulse signals, as inputted through said switch circuit, from zero (0); and a third compare circuit for comparing the counted value of said third counter circuit with a set value set as said second set time, to output, when they coincide, a time lapse signal as said second time lapse signal.

4. A power supply control system, wherein said control circuit according to claim 1 is realized by: a data input unit; a data processing unit operated on the basis of predetermined programs; and a data storing unit.

5. A power supply control system for supplying electric power to arid starting a plurality of disk drive groups having at least one disk drive, composing:

a power source;

a plurality of power supply circuits for supplying said plurality of disk drive groups individually with the electric power from said power source; and a control circuit for controlling said plurality of power supply circuits, wherein said control circuit generates, when said power source is turned ON, a circuit signal for turning ON said plurality of power supply circuits sequentially, wherein said individual power supply circuits supply, when they receive said circuit signal, the corresponding disk drive groups with the electric power so that the starts of said plurality of disk drive groups do not overlap in time, wherein said control circuit outputs, simultaneously as a certain disk drive group completes its start, the circuit signal for turning ON the power supply circuit corresponding to a next disk drive group.

wherein each of said disk drive groups outputs a disk drive start initialization signal, when it initializes its start, and outputs a disk drive start completion signal, when it ends its start, and wherein said control circuit includes:

a second timer circuit, which resets with the circuit signal for turning ON the power supply circuit corresponding to said certain disk drive group, for outputting a second time lapse signal before a second set time elapses after reset and where said disk drive start initialization signal is not received from said certain disk drive group, a first timer circuit being reset with said second time lapse signal;

a first counter circuit, which increases a counted value by one (1) each time said circuit signal is inputted, for designating a number of a disk drive group to be started;

a first compare circuit for comparing, when said disk drive start completion signal or said second time lapse signal is inputted, a preset maximum number of disk drive groups and the number of the disk drive group designated by said first counter circuit, to output, where the number of the disk drive group designated by said first counter circuit is smaller than said preset maximum, the number of the disk drive group designated by said first counter means as the number of the disk drive group to be started next; and a selector circuit for outputting the circuit signal for turning ON the power supply circuit corresponding to the number of said disk drive group to be started next.

6. A power supply control system for supplying electric power to and starting a plurality of disk drive groups having at least one disk drive, comprising:

a power source;

a plurality of power supply circuits for supplying said plurality of disk drive groups individually with the electric power from said power source; and a control circuit for controlling said plurality of power supply circuits, wherein said control circuit generates, when said power source is turned ON, a circuit signal for turning ON said plurality of power supply circuits sequentially, wherein said individual power supply circuits supply, when they receive said circuit signal, the corresponding disk drive groups with the electric power so that the starts of said plurality of disk drive groups do not overlap in time, wherein said control circuit outputs, after said control circuit outputs the circuit signal for turning ON a power supply circuit corresponding to a certain disk drive group, and at the earlier one of the instant when a first set time elapses and the instant when said certain disk drive group completed its start, the circuit signal for turning ON the power supply circuit corresponding to a next disk drive group, wherein each of said disk drive groups outputs a disk drive start initialization signal, when it initializes its start, and outputs a disk drive start completion signal, when it ends its start, and wherein said control circuit includes:

a first timer circuit, which resets with either the circuit signal for turning ON the power supply circuit corresponding to a certain disk drive group or said disk drive start completion signal, for outputting a first time lapse signal when said first set time elapses after reset;

a second timer circuit, which resets with the circuit signal for turning ON the power supply circuit corresponding to said certain disk drive group, for outputting a second time lapse signal before a second set time elapses after reset and where said disk drive start initialization signal is not received from said certain disk drive group, said first timer circuit being reset with said second time lapse signal, said second timer means being reset with said second time lapse signal;

a first counter circuit, which increases a counted value by one (1) each time when said circuit signal is inputted, for designating a number of a disk drive group to be started;

a first compare means for comparing, when any of said disk drive start completion signal, said first time lapse signal and said second time lapse signal is inputted, a preset maximum number of disk drive groups and the number of the disk drive group designated by said first counter circuit, to output, where the number of the disk drive group designated by said first counter circuit is smaller than said preset maximum, the number of the disk drive group designated by said first counter circuit as the number of the disk drive group to be started next; and a selector circuit for outputting the circuit signal for turning ON the power supply circuit corresponding to the number of said disk drive group to be started next.

7. A power supply control system according to claim 6, wherein said first timer circuit includes:

a first oscillator for outputting pulse signals when said power source is turned ON;

a second counter circuit, which resets with an input of any of the circuit signal from said selector circuit, said second time lapse signal from said second timer circuit and said disk drive start completion signal, for counting said pulse signals from zero (0); and a second compare means for comparing a counted value of said second counter means with a set value set as said first set time, to output, when they coincide, a time lapse signal as said first time lapse signal.

8. A power supply control system, wherein said control circuit according to claim 6 is realized by: a data input unit; a data processing unit operated on the basis of predetermined programs; and a data storing unit.

9. A power supply control method for controlling the power supply to a plurality of disk drive groups each having one or more disk drives, comprising the steps of:

initiating the start of a disk drive group of a certain number;

deciding, if a disk drive start initialization signal is received after the start initialization and before a lapse of a second set time and whether or not a first set time elapses after the start initialization;

deciding whether or not all the disk drive groups have completed their starts, if the disk drive start initialization signal is not received before the lapse of the second set time;

deciding whether or not all the disk drive groups have completed their starts, if the first set time lapses;

deciding again whether or not the second set time elapses after the start initialization, if the first set time did not elapse after the start initialization; and initiating the start of a next disk drive group if the starts of all the disk drive groups are not completed, and wherein the foregoing steps are performed on the plurality of disk drive groups until all the disk drive groups have completed their starts.

10. A power supply control method for supplying electric power to and starting a plurality of disk drive groups having at least one disk drive, comprising the steps of:

initiating the start of a disk drive group;

deciding, if a disk drive start initialization signal is received after the start initialization and before a lapse of a set time and whether or not a disk drive start completion signal is received after the start initialization;

deciding whether or not all the disk drive groups have completed their starts, if the disk drive start initialization signal was not received before the lapse of said set time;

deciding whether or not all the disk drive groups have completed their starts, if said disk drive start completion signal is received;

deciding again whether or not said disk drive start completion signal is received after the start initialization, if said disk drive start completion signal is not received; and initiating the start of a next disk drive group if the starts of all the disk drive groups are not completed, and wherein the foregoing steps are performed on the plurality of disk drive groups until all the disk drive groups have completed their starts.

11. A power supply control method for supplying electric power to and starting a plurality of disk drive groups having at least one disk drive, comprising the steps of:

initiating the start of a disk drive group;

deciding, if a disk drive start initialization signal is received after the start initialization and before a lapse of a second set time and whether or not a disk drive start completion signal is received;

deciding whether or not all the disk drive groups have completed their starts after the start initialization, if the disk drive start initialization signal is not received before the lapse of said second set time;

deciding whether or not all the disk drive groups have completed their starts, if said disk drive start completion signal is received;

deciding whether or a not first set time elapses after the start initialization, if said disk drive start completion signal is not received;

deciding whether or not all the disk drive groups have completed their starts, if said first set time elapses after the start initialization;

deciding again whether or not said disk drive start completion signal is received, if said first set time does not elapse after the start initialization; and initiating the start of a next disk drive group if the starts of all the disk drive groups are not completed, and wherein the foregoing steps are performed on the plurality of disk drive groups until all the disk drive groups have completed their starts.

* * * * *